US012372320B1

(12) United States Patent
Falcone et al.

(10) Patent No.: US 12,372,320 B1
(45) Date of Patent: Jul. 29, 2025

(54) SYSTEMS AND TECHNIQUES FOR TESTING A GUN

(71) Applicant: Biofire Technologies Inc., Broomfield, CO (US)

(72) Inventors: Sara Elizabeth Falcone, Lafayette, CO (US); Joseph Ray Wilding, Castle Rock, CO (US); Donna Kelley, Louisville, CO (US); Benjamin William Dwyer, Golden, CO (US)

(73) Assignee: Biofire Technologies Inc., Broomfield, CO (US)

( * ) Notice: Subject to any disclaimer, the term of this patent is extended or adjusted under 35 U.S.C. 154(b) by 0 days.

(21) Appl. No.: 17/541,862

(22) Filed: Dec. 3, 2021

(51) Int. Cl.
*F41A 31/00* (2006.01)
*G01L 5/00* (2006.01)

(52) U.S. Cl.
CPC ............ *F41A 31/00* (2013.01); *G01L 5/0052* (2013.01)

(58) Field of Classification Search
CPC ............................... F41A 31/00; G01L 5/0052
See application file for complete search history.

(56) References Cited

U.S. PATENT DOCUMENTS

| | | | | |
|---|---|---|---|---|
| 3,863,499 A | * | 2/1975 | Von Boutteville | F41A 31/00 73/35.14 |
| 4,050,166 A | * | 9/1977 | Swiatosz | F41G 3/26 434/18 |
| 4,686,886 A | * | 8/1987 | Caserza | F41A 31/00 73/167 |
| 5,563,355 A | * | 10/1996 | Pluta | G01L 1/142 303/3 |
| 6,369,689 B1 | * | 4/2002 | Osmer | G01D 5/04 338/47 |

(Continued)

FOREIGN PATENT DOCUMENTS

| | | | |
|---|---|---|---|
| CN | 202648520 U | * | 1/2013 |
| CN | 109737804 A | * | 5/2019 |

(Continued)

OTHER PUBLICATIONS

Machine translation of CN111060155A (Year: 2020).*
Machine translation of CN202648520U (Year: 2013).*
Machine translation of CN109737804A (Year: 2019).*

*Primary Examiner* — Lee E Rodak
*Assistant Examiner* — Sangkyung Lee
(74) *Attorney, Agent, or Firm* — Perkins Coie LLP; Andrew T. Pettit

(57) ABSTRACT

The present disclosure provides systems and techniques for testing guns by simulating firing a round of live ammunition. A striker may be used to apply force onto a gun, and one or more compressible rods may be used to modulate the application of force onto the gun. A system may include a striking mechanism configured for displacement along an arcuate path of travel that includes a first compressible rod, a second compressible rod coupled with a first component of the gun, an attachment mechanism coupled with a second component of the gun such that the second compressible rod is located in the arcuate path of travel, and a backstop mechanism coupled with the attachment mechanism. The attachment mechanism may stably hold the gun and the backstop mechanism may accommodate planar movement of the attachment mechanism, so as to simulate a shooter holding the gun.

25 Claims, 13 Drawing Sheets

(56) References Cited

U.S. PATENT DOCUMENTS

| | | | |
|---|---|---|---|
| 7,228,261 B2 | 6/2007 | Leonard et al. | |
| 8,166,797 B2 | 5/2012 | Mooty et al. | |
| 9,746,273 B2 * | 8/2017 | Lowrance | F41A 33/06 |
| 9,970,844 B2 | 5/2018 | Rastegar et al. | |
| 10,228,213 B1 * | 3/2019 | Smith | F41C 23/18 |
| 10,571,378 B2 | 2/2020 | Rastegar | |
| 2004/0050827 A1 * | 3/2004 | Aktas | B23K 11/314 |
| | | | 219/117.1 |
| 2010/0099059 A1 * | 4/2010 | Burford | G06G 7/80 |
| | | | 434/16 |
| 2016/0161362 A1 * | 6/2016 | Rastegar | G01M 7/08 |
| | | | 73/12.07 |
| 2019/0056198 A1 * | 2/2019 | Pautler | G01C 3/02 |

FOREIGN PATENT DOCUMENTS

| | | | |
|---|---|---|---|
| CN | 111060155 A | * | 4/2020 |
| EP | 2290314 B1 | | 8/2015 |

* cited by examiner

SYSTEMS AND TECHNIQUES FOR TESTING A GUN

FIELD OF TECHNOLOGY

The teachings disclosed herein generally relate to guns, and more specifically to systems and techniques for testing guns.

BACKGROUND

The term "gun" generally refers to a ranged weapon that uses a shooting tube (also referred to as a "barrel") to launch solid projectiles, though some instead project pressurized liquid, gas, or even charged particles. These projectiles may be free flying (e.g., as with bullets), or these projectiles may be tethered to the gun (e.g., as with spearguns, harpoon guns, and electroshock weapons such as TASER® devices). The means of projectile propulsion vary according to the design (and thus, type of gun), but are traditionally effected pneumatically by a highly compressed gas contained within the barrel. This gas is normally produced through the rapid exothermic combustion of propellants (e.g., as with firearms) or mechanical compression (e.g., as with air guns). When introduced behind the projectile, the gas pushes and accelerates the projectile down the length of the barrel, imparting sufficient launch velocity to sustain it further towards a target after exiting the muzzle.

Most guns use compressed gas that is confined by the barrel to propel the projectile up to high speed, though the term "gun" may be used more broadly in relation to devices that operate in other ways. Accordingly, the term "gun" may not only cover firearms, handguns, shotguns, rifles, semi-automatic guns, and automatic guns, but also electroshock weapons, light-gas guns, plasma guns, and the like.

Significant energies have been spent developing safer ways to use, transport, store, and dispose guns. Gun safety is an important aspect of avoiding unintentional injury due to mishaps like accidental discharge, negligent discharge, and malfunctions. Gun safety is also becoming an increasingly important aspect of designing and manufacturing guns.

SUMMARY

The systems, apparatuses, and techniques described herein support simulating the firing of live ammunition at a gun. Simulating live ammunition can reduce the time and cost associated with testing guns by reducing or eliminating the need for endurance testing with live ammunition. The term "gun," as used herein, may be used to refer to a lethal force weapon, such as a firearm, a pistol, a rifle, a shotgun, a semi-automatic gun, or an automatic gun; a less lethal weapon, such as a stun-gun or a projectile emitting device; or an assembly of components operable to selectively discharge matter or charged particles, such as a fire control system. Note that while embodiments may be described in the context of testing a gun for the purpose of illustration, aspects of the embodiment may be similarly applicable to testing one or more components of a gun.

Generally, the described systems and techniques provide for testing a gun in a repeatable and efficient manner. The gun may be a production gun, a test gun, a component of a gun, or an assembly of multiple components. A system may include a striking mechanism configured for displacement along an arcuate path of travel that includes a first compressible rod, a second compressible rod coupled with a first component of the gun, an attachment mechanism coupled with a second component of the gun such that the second compressible rod is located in the arcuate path of travel, and a backstop mechanism coupled with the attachment mechanism. One or more compressible rods may be used to facilitate a collision with an associated force profile that simulates the force profile associated with firing a round of live ammunition.

The backstop mechanism may accommodate planar movement of the attachment mechanism so as to simulate a user holding the gun. In some cases, a motor may be coupled with the striking mechanism, and the motor may be operable to displace the striking mechanism along a path of travel. For example, the motor may drive the striking mechanism towards the gun along a linear path, or the motor may pull the striking mechanism away from the gun along an arcuate path such that releasing the striking mechanism results in a collision of the striking mechanism and the gun.

Figure 1:
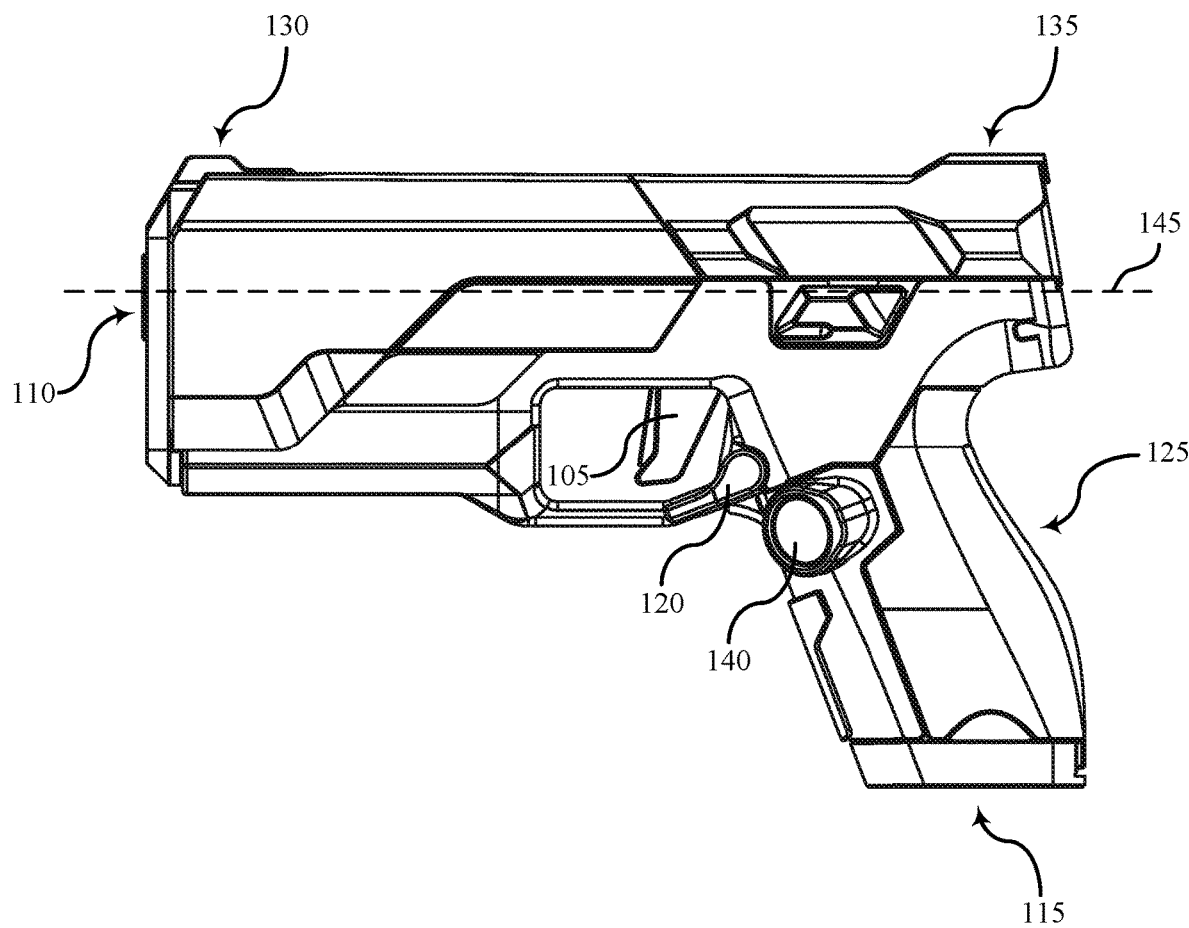
FIG. 1 illustrates an example of a gun that supports testing a gun in accordance with aspects of the present disclosure.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, the technology is amenable to modifications that may not be reflected in the drawings.

DETAILED DESCRIPTION

Testing is an important aspect of designing safe and reliable guns. Some government agencies define tests to validate gun safety, and some manufacturers perform tests to validate gun performance across various conditions (e.g., extreme temperatures and levels of moisture to simulate exposure to different environments) and levels of use (e.g., an unfired gun, a gun that has fired a thousand rounds, a gun that has fired ten thousand rounds, etc.). Testing with live ammunition requires a substantial investment, as live ammunition is expensive and must be fired at an appropriate facility to ensure safety.

Endurance testing—where a large quantity of ammunition is fired—is often used to determine how a single gun component (or simply "component"), collection of multiple components, or the gun itself performs with heavy use. For example, as part of an endurance testing procedure, a gun may fire several thousand rounds of ammunition, and the gun may be inspected after the rounds have been fired to identify weak components. As a result of the testing, weak components can be identified and diagnosed, thereby allowing gun makers to strengthen the design of the gun. Firing thousands of rounds of live ammunition requires time, money, and access to an appropriate facility, as a round of live ammunition contains combustible propellant capable of propelling a projectile through a barrel at high speed. Additionally, live ammunition introduces test variability, as some rounds may contain defects that alter ballistic properties, thereby reducing test repeatability and confidence.

Introduced here, therefore, are systems and techniques for simulating a gunshot. The systems and techniques may be used to test the performance of a gun in a precise and efficient manner. A gun may be a fully functional gun, a partially functional gun, a production unit, a test unit, a component of a gun, or an assembly of components, such as a frame coupled with a slide, barrel, and breechblock. A system for testing guns may include an attachment mechanism for holding a gun in a static position relative to the attachment mechanism, a backstop mechanism for simulating the grip of the gun by an individual (also referred to as a "shooter"), and a striking mechanism (also referred to as a "striker") for striking a component of the gun to simulate firing a round of live ammunition. For the purpose of illustration, the striking mechanism is described as a pivoting hammer mechanism (also referred to as a "hammer"). Note that the striking mechanism described herein does not refer to a "striker" which is sometimes used to ignite a cartridge primer in striker-fired guns. Those skilled in the art will recognize that the term "striking mechanism," as used herein, refers to a mechanism that can consistently and periodically apply force to a gun so as to simulate firing living ammunition.

The mass and velocity of the striker can be adjusted to alter the force applied to the gun by the striker. In some cases, the striker is configured as a pendulum that rotates about a fixed point to strike the gun. The striker can include both a force sensor (e.g., a load cell) and a compressible rod (e.g., a stiff spring). The force sensor can be used to measure the force applied by the striker, and the compressible rod can be used to spread the application of force across a desired time duration, thereby simulating the ballistic force profile associated with firing a round of live ammunition.

A compressible rod (e.g., a spring rod, an elastic rod, or a rod comprised of an alloy, a polymer, or another sturdy yet deformable material) may be used to manage the force profile of the striker colliding with the gun. For example, a compressible rod may be coupled with the gun to facilitate a collision that is characteristic of a ballistic impulse. The striking mechanism may strike a compressible rod located partially inside the barrel of the gun such that force is transferred from the striking mechanism to a breechblock of the gun in a manner that is characteristic of firing a round of live ammunition. The striking mechanism may include an additional compressible rod, and the additional compressible rod of the striking mechanism may collide with the compressible rod of the gun. As further discussed below, the systems and techniques described herein may generate kinetic forces that represent various cartridge characteristics, such as chamber pressure, bullet weight, and muzzle energy. By tuning parameters, such as striker weight, striker velocity, or the elasticity of one or more compression rods, a user (also referred to as an "operator") may modify the force profile to simulate various cartridge loads and types of ammunition.

Moreover, the systems and techniques described here support determining various metrics for both the gun and individual components of the gun. For example, the systems and techniques described here support determining the amount of force and energy applied to the breechblock, determining the amount of movement of the gun, determining the amount of movement of the slide, determining the velocity of the movement of the gun, determining the velocity of the movement of the slide, and determining the timing of various events, such as the initial application of force, the application of peak force, the slide reaching a rearward position, the slide returning to battery, etc.

An attachment mechanism (e.g., a linkage system, such as a four-bar linkage) may be coupled with the gun and manage the path by which the gun travels. The attachment mechanism may be coupled with a backstop mechanism (e.g., a spring, a damper, or a shock), and the backstop mechanism and/or attachment mechanism may be used to simulate various grips and postures that a shooter might assume while holding a gun. For example, a stiff spring can be used to simulate a rigid posture of the shooter or firm grip of the gun, while a soft spring can be used to simulate a limp posture of the shooter or loose grip of the gun. As such, the systems and techniques described herein support simulating various types of grips and postures that a shooter might assume while holding a gun.

In addition to simulating various grips, postures, cartridge loads, and types of ammunition, the systems and techniques described herein provide a manner of testing guns that improves safety while reducing financial cost. Instead of having to purchase ammunition, travel to a range and fire a large quantity of ammunition to test the performance of a gun, the systems and techniques described herein allow an operator to simulate firing live ammunition with a system that is safe, portable, and efficient. Additionally, the systems and techniques described herein provide an operator the ability to control test parameters and simulate different types of ammunition.

Embodiments may be described in the context of executable instructions for the purpose of illustration. For example, a controller may be described as being capable of executing instructions to process data from one or more sensors, record data in memory, or activate a motor such that the motor displaces the striking mechanism. However, those skilled in the art will recognize that aspects of the technology could be implemented via hardware, firmware, or software.

Terminology

References in the present disclosure to "an embodiment" or "some embodiments" means that the feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. For example, the phrase "A is based on B" does not imply that "A" is based solely on "B." Thus, the term "based on" is intended to mean "based at least in part on" unless otherwise noted.

The terms "connected," "coupled," and variants thereof are intended to include any connection or coupling between two or more elements, either direct or indirect. The connection or coupling can be physical, electrical, logical, or a combination thereof. For example, elements may be electrically or communicatively coupled with one another despite not sharing a physical connection. As one illustrative example, a first component is considered coupled with a second component when there is a conductive path between the first component and the second component. As another illustrative example, a first component is considered coupled with a second component when the first component and the second component are fastened, joined, attached, tethered, bonded, or otherwise linked.

The term "module" may refer broadly to software, firmware, or hardware. Modules are typically functional components that generate one or more outputs based on one or more inputs. A computer program may include or utilize one or more modules. For example, a computer program may utilize multiple modules that are responsible for completing different tasks, or a computer program may utilize a single module that is responsible for completing all tasks.

When used in reference to a list of multiple items, the term "or" is intended to cover all of the following interpretations: any of the items in the list, all of the items in the list, and any combination of items in the list. For example, the list "A, B, or C" indicates the list "A" or "B" or "C" or "A and B" or "A and C" or "B and C" or "A and B and C."

Overview of Guns

FIG. 1 illustrates an example of a gun 100 that supports testing in accordance with aspects of the present disclosure. The gun 100 may include a trigger 105, a barrel 110, a magazine 115, and a magazine release 120. While these components are generally found in firearms, such as pistols, rifles, and shotguns, those skilled in the art will recognize that the technology described herein may be similarly applicable to other types of guns as discussed above. As an example, comparable components may be included in vehicle-mounted weapons that are not intended to be held or operated by hand. While not shown in FIG. 1, the gun 100 may also include a striker (e.g., a ratcheting striker or rotating striker) or a hammer that can be actuated by pulling the trigger 105. When pulled, the trigger 105 may release the striker or hammer, thereby causing the striker or hammer to contact a firing pin, percussion cap, or primer, so as to ignite a propellant and fire a projectile through the barrel 110. Embodiments of the gun 100 may also include a blowback system, a locked breech system, or any combination thereof. These systems are more commonly found in self-reloading firearms. The blowback system may be responsible for obtaining energy from the motion of the case of the projectile as it is pushed to the rear of the gun 100 by expanding propellant, while the locked breech system may be responsible for slowing down the opening of the breech of a self-reloading firearm when fired. Accordingly, the gun 100 may support the semi-automatic firing of projectiles, the automatic firing of projectiles, or both.

The gun 100 may include one or more safeties that are meant to reduce the likelihood of an unintended discharge or an unauthorized use. The gun 100 may include one or more mechanical safeties, such as a trigger safety or a firing pin safety. The trigger safety may be incorporated in the trigger 105 to prevent the trigger 105 from moving in response to lateral forces placed on the trigger 105. The term "lateral forces," as used herein, may refer to a force that is substantially orthogonal to a central axis 145 that extends along the barrel 110 from the front to the rear of the gun 100. The firing pin safety may block the displacement path of the firing pin until the trigger 105 is pulled. Additionally or alternatively, the gun 100 may include one or more electronic safety components, such as an electronically actuated drop safety. In some cases, the gun 100 may include both mechanical and electronic safeties to decrease the potential for unintended discharges and increase gun safety.

The gun 100 may include one or more sensors, such as a user presence sensor 125 and a biometric sensor 140. In some cases, the gun 100 may include multiple user presence sensors 125 whose outputs can collectively be used to detect the presence of a user. For example, the gun 100 may include a time of flight (TOF) sensor, a force sensor, a resistive sensor, or a mechanical switch. As another example, the gun 100 may include a proximity sensor that is configured to emit an electromagnetic field or electromagnetic radiation, like infrared, and looks for changes in the field or return signal. As another example, the gun 100 may include an audio input mechanism (e.g., a transducer implemented in a microphone) that is configured to generate a signal that is representative of nearby sounds, and the presence of the user can be detected based on an analysis of the signal. Additionally or alternatively, the gun 100 may include one or more biometric sensors 140 as shown in FIG. 1. For example, the gun 100 may include a fingerprint sensor (also referred to as a "fingerprint scanner"), an image sensor, or an audio input mechanism. The fingerprint scanner may generate a digital image (or simply "image") of the fingerprint pattern of the user, and the fingerprint pattern can be examined (e.g., on the gun 100 or elsewhere) to determine whether the user should be verified. The image sensor may generate an image of an anatomical feature (e.g., the face or eye) of the user, and the image can be examined (e.g., on the gun 100 or elsewhere) to determine whether the user should be verified. Normally, the image sensor is a charge-coupled device (CCD) or complementary metal-oxide semiconductor (CMOS) sensor that is included in a camera module (or simply "camera") able to generate color images. The image sensor need not necessarily generate images in color, however. In some embodiments, the image sensor is configured to generate ultraviolet, infrared, or near infrared images. Regardless of its nature, images generated by the image sensor can be used to authenticate the presence or identity or the user. As an example, an image generated by a camera may be used to perform facial recognition of the user. The audio input mechanism may generate a signal that is representative of audio containing the voice of the user, and the signal can be examined (e.g., on the gun 100 or elsewhere) to determine whether the user should be verified. Thus, the signal generated by the audio input mechanism may be used to perform speaker recognition of the user. Including multiple biometric sensors in the gun 100 may support a robust authentication procedure that functions in the event of sensor failure, thereby improving gun reliability. Note, however, that each of the multiple biometric sensors may not provide the same degree or confidence of identity verification. As an example, the output produced by one biometric sensor (e.g., an audio input mechanism) may be used to determine whether a user is present while the output produced by another biometric sensor (e.g., a fingerprint scanner or image sensor) may be used to verify the identity of the user in response to a determination that the user is present.

The gun 100 may support various types of gun sights (or simply "sights"). At a high level, a sight is an aiming device that may be used to assist in visually align the gun 100 (and, more specifically, its barrel 110) with a target. For example, the gun 100 may include iron sights that improve aim without the use of optics. Additionally or alternatively, the gun 100 may include telescopic sights, reflex sights, or laser sights. In FIG. 1, the gun 100 includes two sights—namely, a front sight 130 and a rear sight 135. In some cases, the front sight 130 or the rear sight 135 may be used to indicate gun state information. For example, the front sight 130 may include a single illuminant that is able to emit light of different colors to indicate different gun states. As another example, the front sight 130 may include multiple illuminants, each of which is able to emit light of a different color, that collectively are able to indicate different gun states. One example of an illuminant is a light-emitting diode (LED).

The gun 100 may fire projectiles, and the projectiles may be associated with lethal force or less-lethal force. For example, the gun 100 may fire projectiles containing lead, brass, copper, zinc, steel, plastic, rubber, synthetic polymers (e.g., nylon), or a combination thereof. In some cases the gun 100 is configured to fire lethal bullets containing lead, while in other cases the gun 100 is configured to fire less-lethal bullets containing rubber. As mentioned above, the technology described herein may also be used in the context of a gun that fires prongs (also referred to as "darts") which are intended to contact or puncture the skin of a target and then carry electric current into the body of the target. These guns are commonly referred to as "electronic control weapons" or "electroshock weapons." One example of an electroshock weapon is a TASER device.

As further discussed below, the gun 100 may be coupled with a compressible rod for testing purposes. For example, the barrel 110 may be coupled with the compressible rod such that the compressible rod transfers force to a breechblock in a manner that is substantially similar to how force would be transferred to the breechblock in response to the gun 100 firing a round of live ammunition. The gun 100 may be loaded into an attachment mechanism (e.g., a linkage system, such as a four-bar linkage). The attachment mechanism may be coupled with a component of the to the gun 100, such as the grip, the frame, the chassis, or the like. In some cases, the attachment mechanism may be mechanically coupled with a metal or alloy component of the gun 100, such as the frame.

Figure 2:
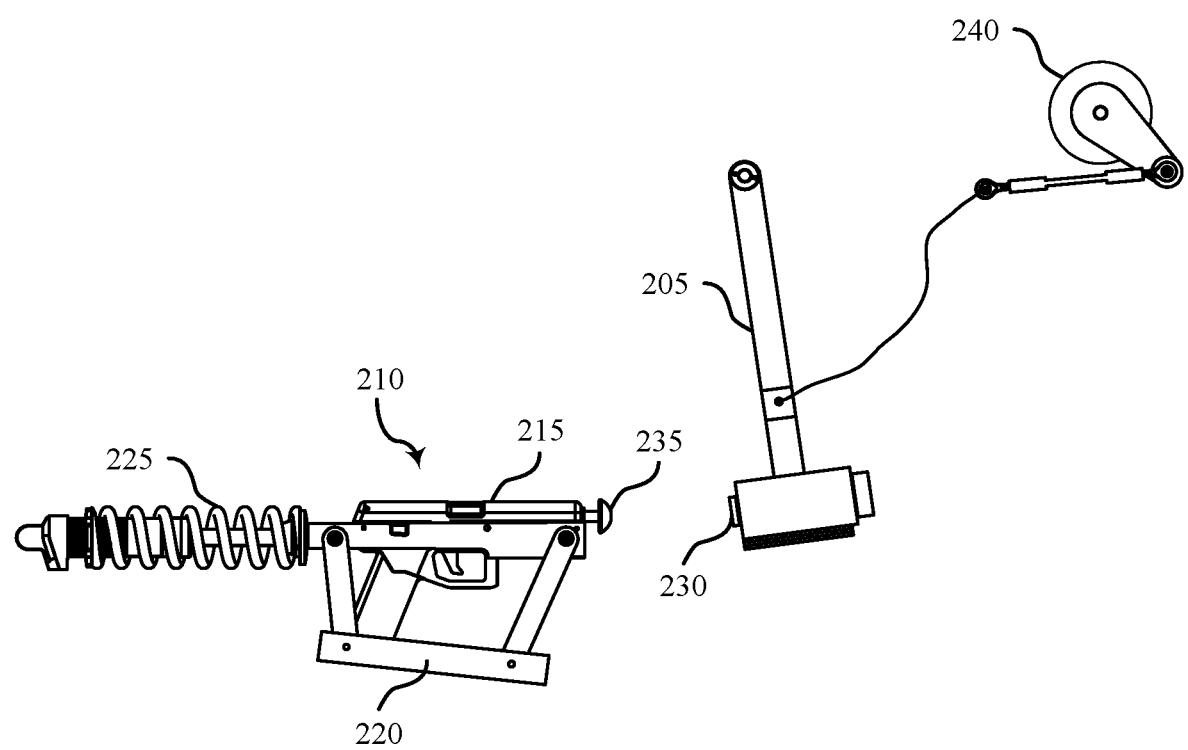
FIG. 2 illustrates an example of a system that supports testing a gun in accordance with aspects of the present disclosure.

FIG. 2 illustrates an example of system 200 that supports testing a gun in accordance with aspects of the present disclosure. The gun 210 may be an example of a production gun, a prototype gun, a test unit, a component of a gun, or an assembly of components. Thus, the gun 210 may be the gun 100 of FIG. 1. The system 200 simulates internal ballistics at the gun 210 by producing a force profile that represents a ballistic force profile.

The striker 205 (e.g., a hammer, a mallet, a piston, etc.) may collide, directly or indirectly, with the gun 210. For example, the striker 205 may collide with a compressible rod 235 coupled to the gun 210, and the compressible rod 235 may transfer force to a component 215 (e.g., the breechblock, the barrel, the slide, the frame, a sensor, etc.) of the gun 210. The striker 205 may also include a compressible rod 230. As such, the striker 205 may apply force to the component 215 directly or indirectly via one or more intervening compressible rods. The force applied to the component 215 is similar to the force that would be applied to the component 215 if the gun 210 were to fire a round of live ammunition.

The compressible rod 230 may be removably coupled with the striker 205, and the compressible rod 235 may be removably coupled with the gun 210. A mechanical fastener, a spring, adhesive, friction, a magnetic field, or any combination thereof may be used to couple a compressible rod (e.g., the compressible rod 230 or the compressible rod 235) with a test device (e.g., the striker 205 or the gun 210). For example, a fastener may be used to removably couple the compressible rod 230 with the striker 205, and a frictional force associated with an exterior surface of the compressible rod 235 contacting an interior surface of a barrel of the gun 210 may be used to removably couple the compressible rod 235 with the gun 210. Allowing an operator to swap compressible rods improves the operator's control over the force profile of the collision between the striker 205 and the gun 210. For example, the compressible rod 230 may be swapped with a more elastic compressible rod to spread the application of force across a longer duration of time, or the compressible rod 230 may be swapped with a less elastic compressible rod to shorten the duration of time over which the force is applied.

The gun 210 may be coupled with an attachment mechanism 220 (e.g., a linkage system, such as a four-bar linkage) via one or more fasteners (e.g., screws, bolts, nuts, anchors, rivets, nails, welds, adhesives, etc.). In some cases, a component of the gun 210, such as a frame or a grip, may be coupled with the attachment mechanism 220. The attachment mechanism 220 may be coupled with the backstop mechanism 225 (e.g., a spring, a damper, a shock, etc.) via one or more fasteners, and the backstop mechanism 225 may manage the movement of the attachment mechanism 220. The backstop mechanism 225 may support configuring the path by which the gun 210 travels. For example, any combination of the total travel, the compression rate, the rebound rate, the preload, or the crossover point may be configured to manage the movement of the attachment mechanism 220 and/or the gun 210. As such, an operator may simulate various types of grips and postures a shooter might assume while firing a gun.

The motor 240 may be used to displace the striker 205. In some cases, the motor 240 may be used to reset the striker 205 to a location resulting in the striker 205 possessing energy (e.g., gravitational energy) that is similar to the energy (e.g., chemical energy) possessed by a round of live ammunition. In some other cases, the motor 240 may be used to drive the striker 205 towards the gun 210 such that the striker 205 possesses energy (e.g., kinetic energy) that is similar to the energy (e.g., chemical energy) possessed by a round of live ammunition. The motor 240 supports automating the displacement of the striker 205, thereby providing an automated procedure for testing the gun 210. For example, the motor 240 could be driven (e.g., by a controller) such that the striker 205 is periodically displaced at a predetermined frequency.

Figure 3:
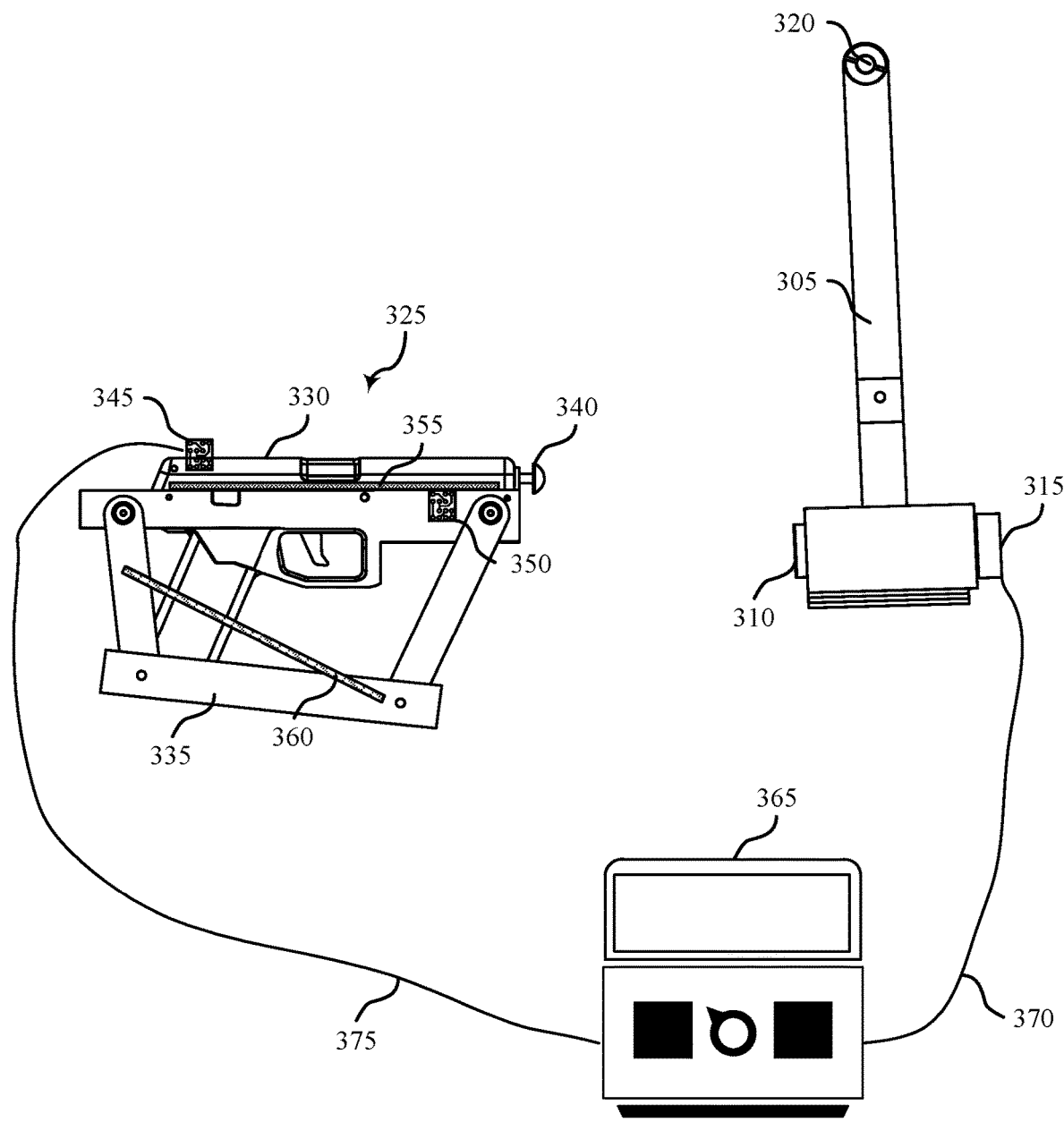
FIG. 3 illustrates an example of a system that supports testing a gun in accordance with aspects of the present disclosure.

FIG. 3 illustrates an example of a system 300 that supports testing a gun 325 in accordance with aspects of the present disclosure. The striking mechanism 305 may be used to apply force to the gun 325 in a manner that is characteristic of a ballistic event (e.g., firing a round of live ammunition), and the controller 365 may measure various signals of the system 300, process data, record data, display data, initiate a test procedure (e.g., a test cycle), or terminate a test procedure.

The controller 365 may include a communication channel 370 (e.g., a wire, a bus, a radio-frequency region) coupled with the sensor 315 (e.g., a load cell or an accelerometer) and/or a communication channel 375 (e.g., a wire, a bus, a radio-frequency region) coupled with the sensor 345 (a photo-interrupter, an accelerometer, an inertial measurement unit (IMU), etc.). The term "controller," as used herein, may be used to refer to a computing device that includes the components needed to partially or fully manage testing of the gun 325. In addition to the communication channels 370, 375 and sensor 315, the controller 365 could include a processor, an oscilloscope, an analog-to-digital converter (ADC), a digital-to-analog converter (DAC), and the like. While the system 300 illustrates communication channel 370 and communication channel 375, it should be understood that communications channels may be added to, or removed from, the system 300.

The system 300 illustrates multiple sensors, but it should be understood that sensors may be added to, or removed from, the system 300. The distal end of the striking mechanism 305 includes a sensor 315 (e.g., a load cell) and a compressible rod 310. The sensor 315 may be coupled with the compressible rod 310. In some cases, the striking mechanism 305 may include a spring at the distal end that keeps the sensor 315 in contact with the compressible rod 310. The sensor 315 may be used to measure the force applied by the striking mechanism 305.

The attachment mechanism 335 includes a sensor 360 (e.g., a linear position sensor), a sensor 350 (e.g., a microphone), and a sensor 355 (e.g., a linear encoder). Meanwhile, the component 330 may also include a sensor 345 (e.g., a photo-interrupter). A camera (e.g., a slow-motion camera) may be used to record the striking mechanism 305 colliding with the gun 325. For example, a camera may be positioned such that the gun 325 is in frame, and the camera may record displacement of the component 330 in response to the collision. The sensor 360 may be used to may be used to measure movement of the attachment mechanism 335, the sensor 350 may be used to identify the timing of events (such as a collision), the sensor 355 may be used to measure movement of the component 330, and the sensor 345 may be used to identify movement of the component 330 and/or initiate the resetting of the striking mechanism 305 after each collision. In some cases, the system 300 may include one or more accelerometers. For example, the sensor 315 and/or the sensor 345 may include accelerometers. It should be understood that sensors may be added to, or removed from, the system 300, and the sensors may perform additional functions to the examples provided herein, or the sensors may refrain from performing some of the examples of functions provided herein.

The striking mechanism 305 may be operable to rotate about the pivot 320. For example, the striking mechanism 305 may be coupled with a fixture via one or more fasteners at a proximal end of the striking mechanism 305 such that a distal end of the striking mechanism 305 rotates about the pivot 320 along an arcuate path. When used in reference to the striking mechanism 305, the term "proximal end" may refer to the end that is coupled with the fixture while the term "distal end" may refer to the end that includes the compressible rod 310 and sensor 315. In some cases, a backstop mechanism and/or the attachment mechanism 335 may be coupled with the fixture. For example, the attachment mechanism 335 may be fastened to a backstop mechanism, and the backstop mechanism may be fastened to the fixture. The term "fixture," may be used to refer to a rigid structural frame to which the striking mechanism 305, backstop mechanism, or attachment mechanism 335 may be coupled for support.

The gun 325 may be located in a predetermined location, and the striking mechanism 305 may be configured to travel along a path such that the striking mechanism collides with the gun 325, the compressible rod 340, or the component 330. In some examples, the striking mechanism 305 may travel along an arcuate path, while in some other examples, the striking mechanism 305 may travel along a linear path. In one example, a distal end of the striking mechanism 305 may pivot about a proximal end such that the distal end travels along an arcuate path, while in another example, the striking mechanism 305 may travel along a linear path. The pivot 320 and/or the gun 325 may be located such that the compressible rod 340 is located in the path of travel of the striking mechanism 305, thereby facilitating a collision between the striking mechanism 305 and the gun 325.

Figure 4:
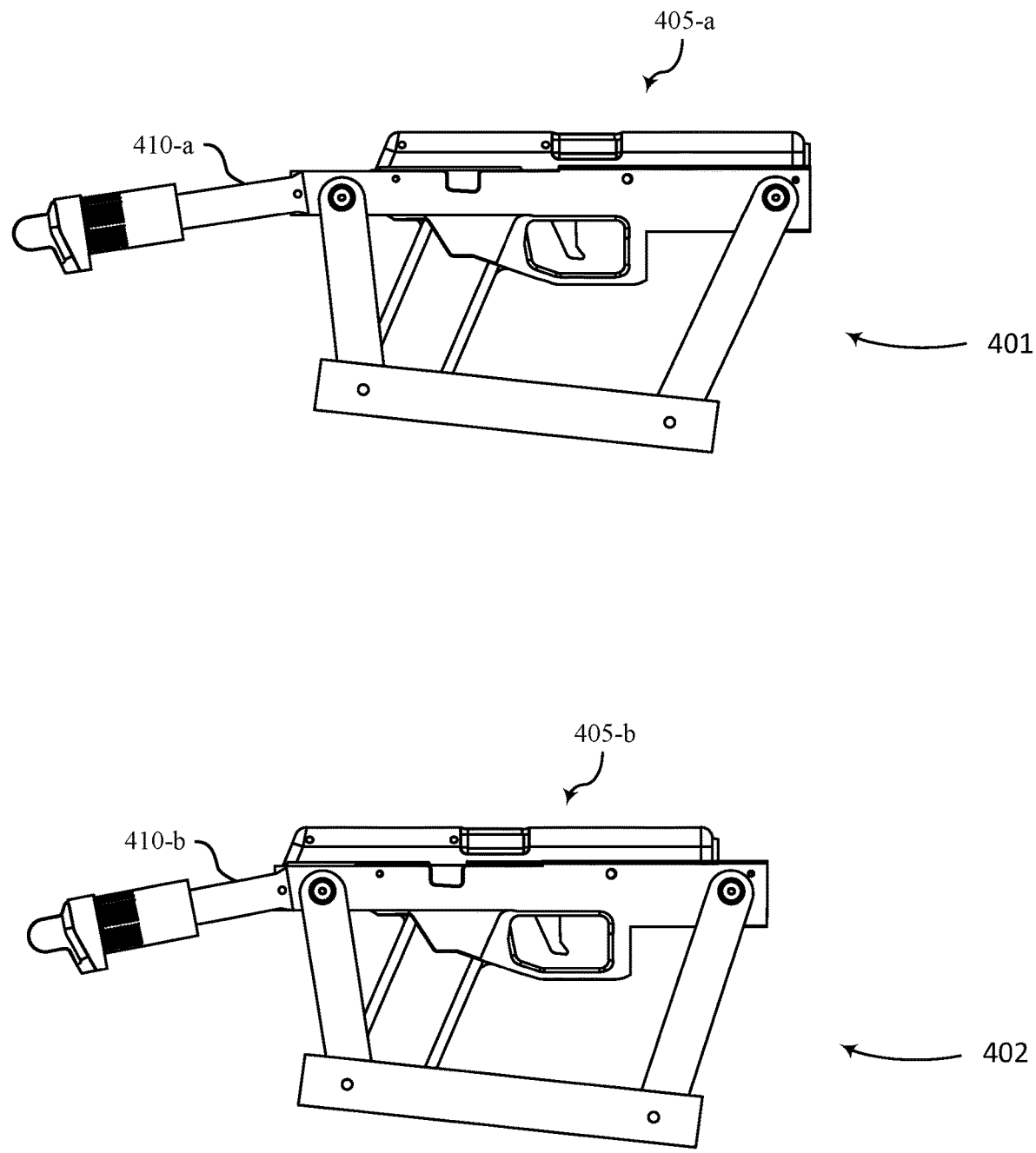
FIG. 4 illustrates an examples of attachment mechanisms and backstop mechanisms that support testing a gun in accordance with aspects of the present disclosure.

FIG. 4 illustrates an example of an attachment mechanism 401 and an attachment mechanism that 402 that support testing a gun in accordance with aspects of the present disclosure.

The attachment mechanism 401 illustrates an example of a component 405-*a* (e.g., a slide) in a default position. The default position of the component 405-*a* corresponds to a slide in battery. The backstop mechanism 410-*a* (e.g., a shock) is also in a default position. While in the default position, the backstop mechanism 410-*a* is not under substantial load. In other words, both the component 405-*a* and the backstop mechanism 410-*a* are in a resting position.

The attachment mechanism 402 illustrates an example of a component 405-*b* (e.g., a slide) in an active position. The active position of the component 405-*b* corresponds to a slide at the end of recoil, or otherwise out of battery. The backstop mechanism 410-*b* is also in an active position. While in the active position, the backstop mechanism 410-*b* is under load that is similar to a ballistic load. In other words, The attachment mechanism 401 illustrates an example of an attachment mechanism just before a collision with a striking mechanism, and the attachment mechanism 402 illustrates an example of an attachment mechanism just after a collision with a striking mechanism.

A backstop mechanism (e.g., a backstop mechanism 410-*a* or a backstop mechanism 410-*b*) may include a shock, spring, damper, dashpot, or the like to simulate movement of a shooter's hand while firing a gun. In some cases, a backstop mechanism may include a progressive air shock, and the progressive air shock may include a volume reducer. A progressive air shock yields a dynamic spring rate based on the position of the shock within its stoke, and a volume reducer allows the spring rate to increase as the shock reaches the middle or end of its stroke while not impacting the spring rate when the shock is early in its stoke. Configuring aspects of a backstop mechanism, such as the spring rate and/or the stroke length, allows an operator to simulate various types of grips and postures a shooter might assume while holding and firing a gun.

In some examples, the backstop mechanism may be configured with a low spring rate to simulate a loose grip of the gun, and the backstop mechanism may be configured with a high spring rate to simulate a firm grip of the gun. In another example, the backstop mechanism may be configured with a large stroke length to simulate a shooter holding the gun by their side, or the backstop mechanism may be configured with a short stroke length to simulate a shooter holding the gun with arms locked. Aspects of the backstop mechanism, such as the stroke length, spring rate, or spring rate profile (e.g., the spring rate at different points in the stroke) may be configured to simulate multiple grips and postures a shooter might assume while firing the gun.

In some cases, an attachment mechanism may be coupled with a backstop mechanism, while in some other cases, an attachment mechanism may include a backstop mechanism. In other words, the attachment mechanism may include aspects of both the attachment mechanism and the backstop mechanism, or the attachment mechanism may be coupled with the backstop mechanism. For example, an attachment mechanism may be fastened to a backstop mechanism, or an attachment mechanism may include an air spring that simulates a shooter's grip of the gun.

Figure 5:
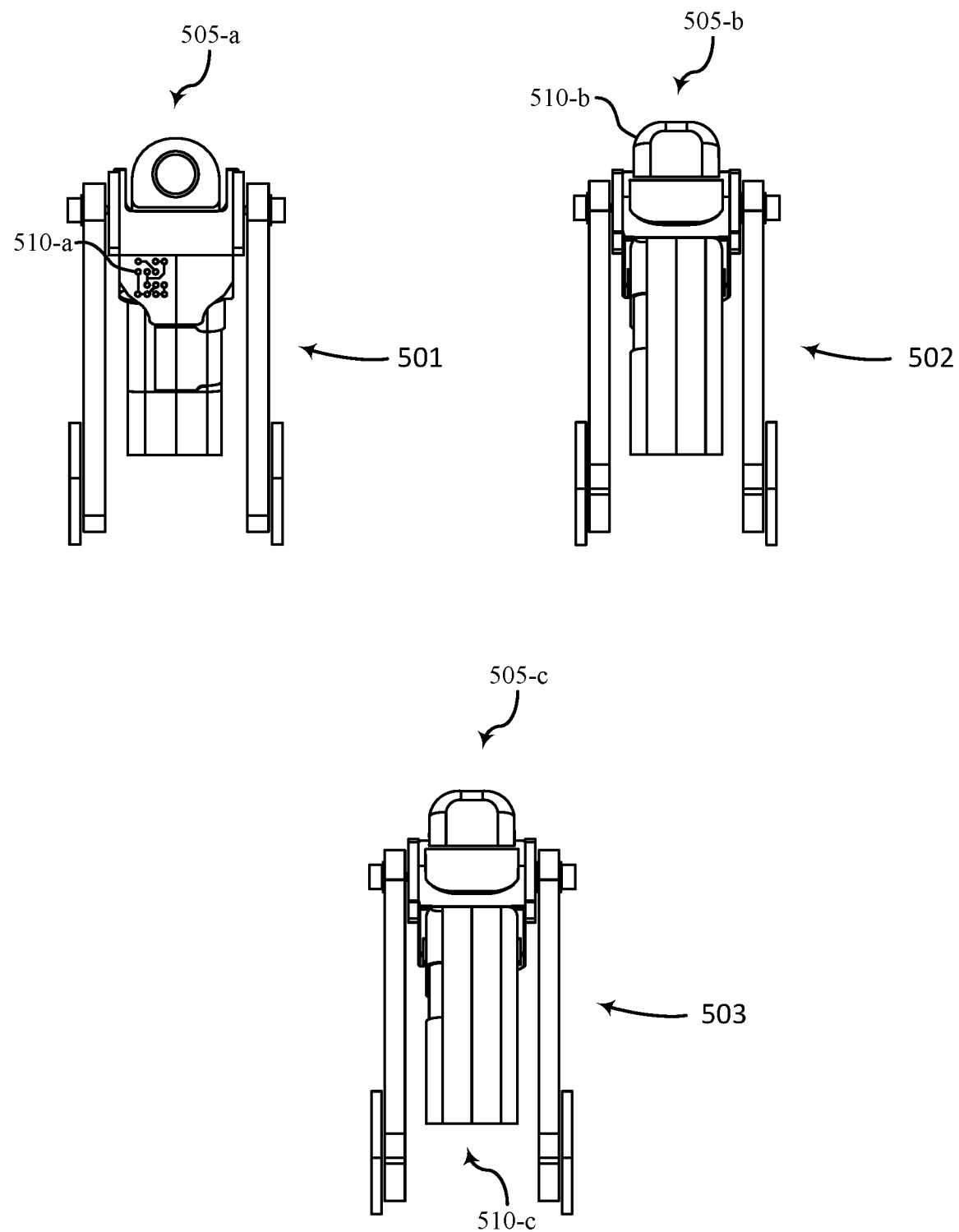
FIG. 5 illustrates examples of attachment mechanisms and components of guns that support testing a gun in accordance with aspects of the present disclosure.

FIG. 5 illustrates an example of an attachment mechanism 501, an attachment mechanism 502, and an attachment mechanism 503 that support testing a gun in accordance with aspects of the present disclosure. An attachment mechanism may include any combination of a housing, a track, a cog, a pulley, or a linkage, such as a four-bar linkage, a six-bar linkage, or an eight-bar linkage. The attachment mechanism may be coupled with, or include aspects of, a backstop mechanism as described herein. In other words, the attachment mechanism may be separate from the backstop mechanism, or a single mechanism may encompass the attachment mechanism and the backstop mechanism.

The attachment mechanism 501 is coupled with a gun 505-a (e.g., a test unit) that includes a sensor 510-a (e.g., a component of a gun). The sensor 510-a may be an example of, or include aspects of, a camera, a fingerprint reader, a projector, a memory bank, a capacitor, a proximity sensor, a pressure sensor, or the like. The systems and techniques described herein support simulating gunshots to test the gun 505-a and the sensor 510-a.

The attachment mechanism 502 is coupled with a gun 505-b (e.g., a test unit) that includes a slide 510-b (e.g., a component of a gun). The slide 510-b may be coupled with a frame and include one or more components, such as a breechblock, an ejector, a striker (of a striker-fired gun, not a striking mechanism described herein), a safety mechanism, etc. The systems and techniques described herein support simulating gunshots to test the gun 505-b and the slide 510-b.

The attachment mechanism 503 is coupled with a gun 505-c (e.g., a test unit) that includes an assembly 510-c (e.g., a component of a gun). The assembly 510-c may be a single component or a collection of components. The attachment mechanisms described herein support holding a gun (e.g., a test unit), which may be a fully functional gun, a partially functional gun, or an assembly of components, such as an assembly of mechanical elements and/or electrical elements. A compressible rod may transfer force to a component of a gun in manner representing a ballistic event so as to test the performance of the component. The component may be a sensor, a slide, an assembly, or any aspect thereof. As an illustrative example, the compressible rod may be positioned inside a barrel of the gun, and force may be transferred through the compressible rod to a breechblock. The systems and techniques described herein support simulating gunshots to test fully functional guns, partially functional guns, assemblies of gun components, and individual gun components.

In some examples, an operator may use a controller to configure a test cycle (e.g., a test procedure) such as a one-round test cycle or a multi-round test cycle (e.g., comprising 1,000 rounds, 10,000 rounds, etc.), and the controller may activate a motor that displaces a striking mechanism, monitor one or more sensors for anomalies or errors, collect data from the one or more sensors, process data from the one or more sensors, store data, display data, or deactivate the motor. The operator may inspect the gun and/or review the data to validate the performance of the gun and/or identify weak components of the gun. The operator may be testing a component, such as a barrel or sensor, an assembly of components, such as a fire-control-system, a feed system, or a fully assembled gun, such as a production gun. The systems and techniques described herein improve gun testing, as weak components may be identified and fixed, and gun performance may be validated.

Figure 6:
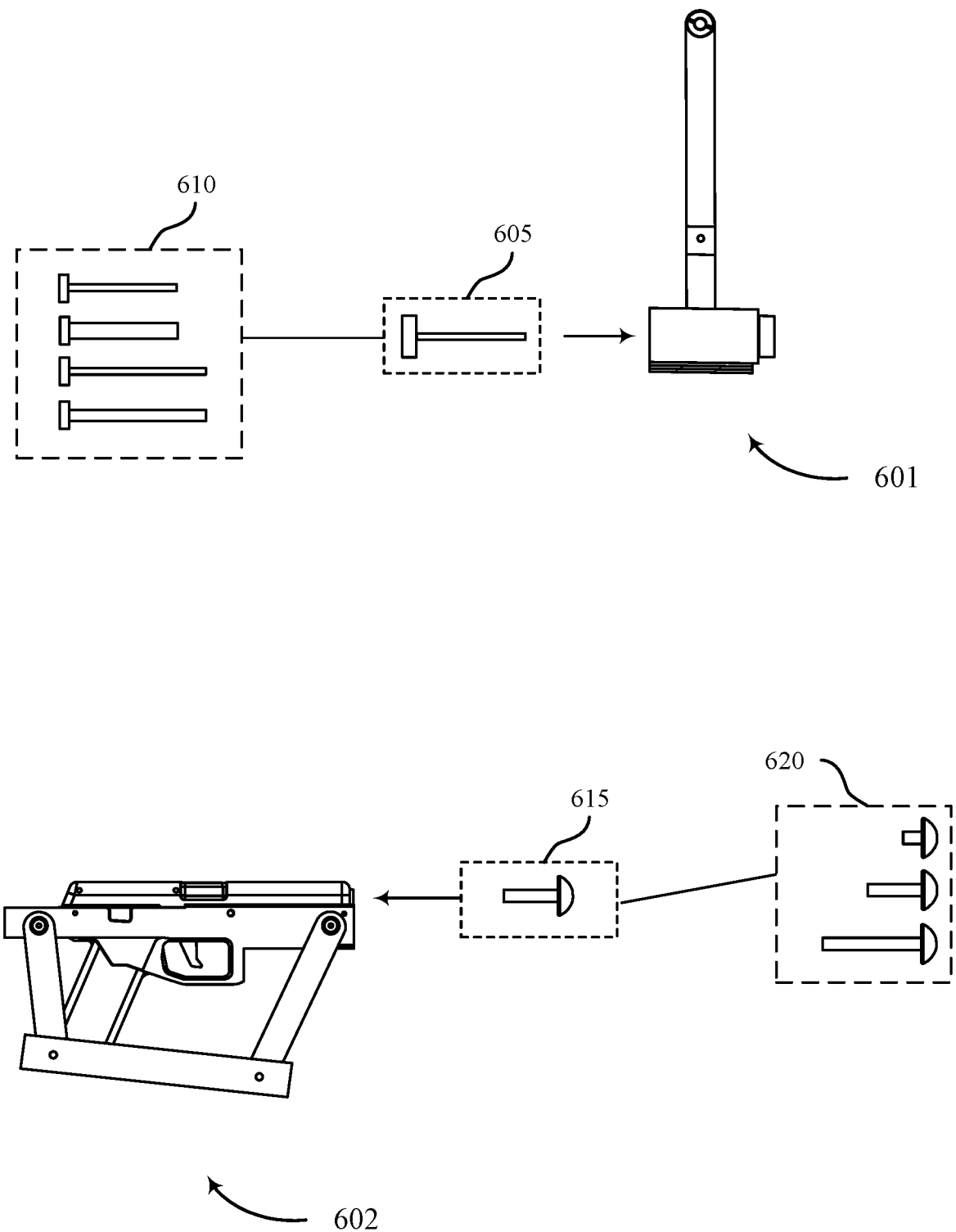
FIG. 6 illustrates an example of a striking mechanism and a gun that support testing a gun in accordance with aspects of the present disclosure.

FIG. 6 illustrates an example of a striking mechanism 601 and a gun 602 that support testing a gun in accordance with aspects of the present disclosure. The striking mechanism 601 may be used to apply force to the gun 602, and the force applied by the striking mechanism 601 may replicate the force associated with firing a round of live ammunition.

The compressible rod 605 may be removably coupled with the striking mechanism 601, and an operator may replace the compressible rod 605 with one of the alternative compressible rods 610 to modify the force applied by the striking mechanism 601. Each of the alternative compressible rods 610 may be associated with different properties or characteristics. For example, each of the alternative compressible rods 610 may include material associated with an elastic modulus (e.g., Young's modulus, bulk modulus, shear modulus, etc.), as well as a structure yielding a desired spring constant value. An operator may couple the striking mechanism 601 with a compressible rod to achieve a desired force profile associated with a collision.

In some cases, the alternative compressible rods 610 may include material and/or components that modulate the transfer of energy by the striking mechanism 601. For example, one of the alternative compressible rods 610 may include a structure that modulates the transfer of energy, such as a chamber containing liquid or gas and a valve that regulates the outflow of the liquid or gas in response to a collision, or one of the alternative rods 610 may include a mechanism that converts kinetic energy into thermal energy in response to a collision. The material of a compressible rod and/or the structure of a compressible rod may be selected to modulate the transfer of energy by the striking mechanism 601. As such, the force profile of the striking mechanism 601 colliding with the gun 602 may be controlled based on selecting a compressible rod that produces a force profile representing the force profile associated with firing a round of live ammunition.

The striking mechanism 601 may include a load cell and a spring configured to maintain contact between the load cell and the compressible rod 605. The gun 602 may include a compressible rod 615, and one of the alternative compressible rods 620 may be used to modify the force applied to the gun 602. The gun 602 may include a spring configured to maintain contact between a component (e.g., a breechblock) and the compressible rod 615.

A system for testing guns, as described herein, may include zero, one, or multiple compressible rods. In some examples, the gun 602 may include a compressible rod and the striking mechanism 601 may not include a compressible rod, while in some other examples, the striking mechanism 601 may include a compressible rod and the gun 602 may not include a compressible rod. In other examples, both the striking mechanism 601 and the gun 602 may include compressible rods.

Figure 7:
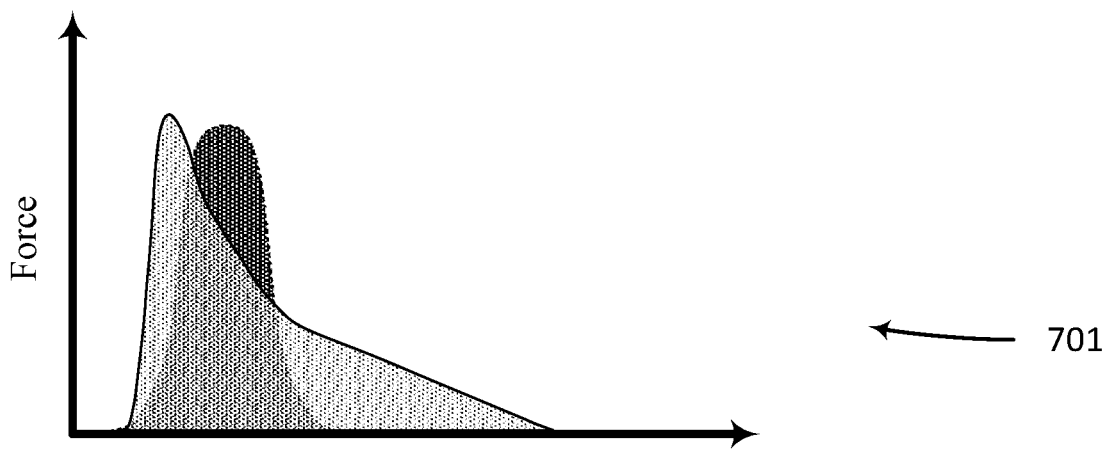
FIG. 7 illustrates examples of force profiles that support testing a gun in accordance with aspects of the present disclosure.
Figure 7:
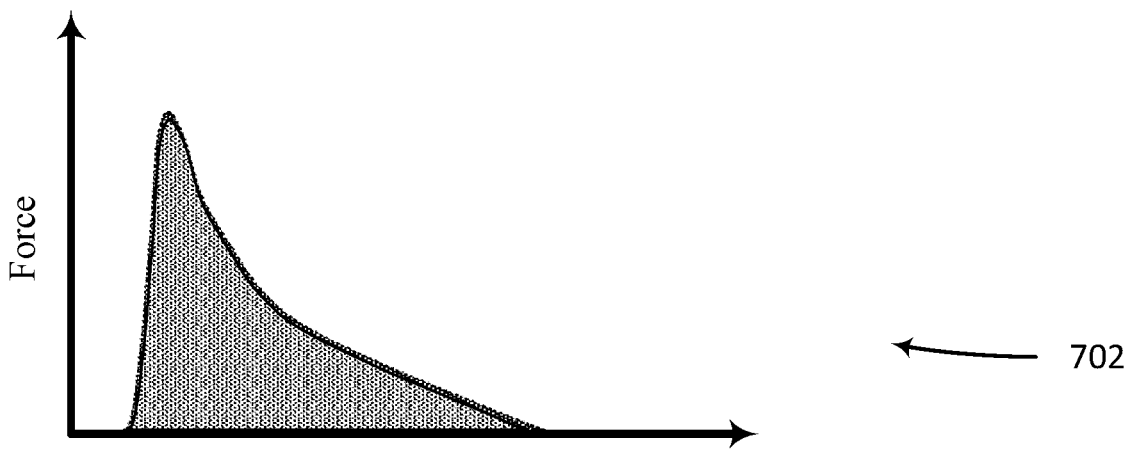

FIG. 7 illustrates an example of a graph 701 and a graph 702 that support testing a gun in accordance with aspects of the present disclosure. The graph 701 illustrates an example of a ballistic impulse (ballistic force profile 705-*a*) and a naïvely simulated impulse (naïvely simulated force profile 710-*a*), while the graph 702 illustrates an example of a ballistic impulse (ballistic force profile 705-*b*) and a simulated impulse (simulated force profile 710-*b*) that substantially conform with one another.

As illustrated in the graph 701, the ballistic force profile 705-*a* corresponds to a ballistic event, such as firing a round of live ammunition. As shown by the ballistic force profile 705-*a* (which may illustrate the pressure on the breechface, the pressure within in the chamber, etc.), the force rapidly increases and then decreases more slowly. As shown by the naïvely simulated force profile 710-*a* (e.g., a collision without compressible rods, a collision between components with high moduli of elasticity, etc.), the force increases rapidly and decreases rapidly. The systems and techniques described herein support transforming the naïvely simulated force profile 710-*a* into the simulated force profile 710-*b*, thereby improving the degree to which a simulated ballistic event represents an actual ballistic event.

As illustrated in the graph 702, the ballistic force profile 705-*b* corresponds to a ballistic event, such as firing a round of live ammunition. The simulated force profile 710-*b* closely resembles the ballistic force profile 705-*b*. Various parameters may be configured to achieve the simulated force profile 710-*b*. For example, the mass of the striking mechanism, the velocity of movement of the striking mechanism, the material of a compressible rod, the structure of a compressible rod, or the number of compressible rods used in the system may be configured to achieve the simulated force profile 710-*b*. The ballistic force profile 705-*b* may correspond to a type of ammunition or cartridge load, and the simulated force profile 710-*b* may be tuned to match, or be substantially similar to, the ballistic force profile 705-*b*. As described herein, a compressible rod may be used to manage a force profile such that the force profile includes characteristics that represent a ballistic force profile.

Figure 8:
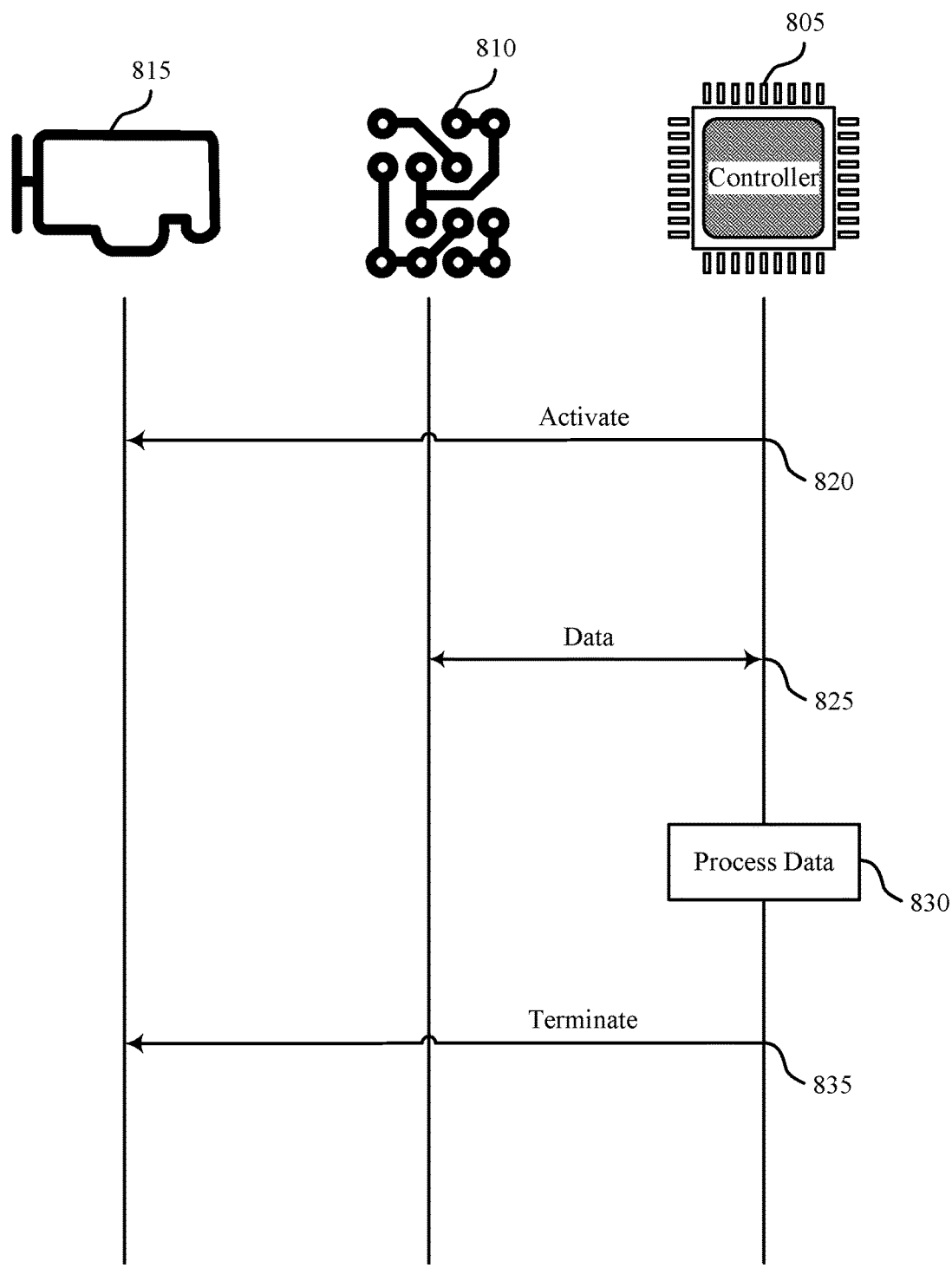
FIG. 8 illustrates an example of a process flow that supports testing a gun in accordance with aspects of the present disclosure.

FIG. 8 illustrates an example of a process flow 800 that supports testing a gun in accordance with aspects of the present disclosure. The process flow 800 includes a controller 805, a sensor 810, and a motor 815, which may be examples of the corresponding components as described with reference to FIGS. 1 through 7. Alternative examples of the following may be implemented, where some steps are performed in a different order than described or are not performed at all. In some cases, steps may include additional features not mentioned below, or further steps may be added.

The controller 805 may transmit an activation signal to the motor 815 (step 820). In some cases, the controller 805 may transmit the activation signal based on a user input. For example, an operator may enter a user input via a computer peripheral (e.g., a mouse, keyboard, etc.), and the controller 805 may transmit the activation signal based on the user input. The operator may indicate a cycle count (e.g., one cycle, a thousand cycles, ten thousand cycles, a hundred thousand cycles, etc.) via the peripheral, and the controller 805 may manage the motor 815 such that the motor 815 displaces a striking mechanism according to the indicated cycle count.

In response to the activation signal, the motor 815 may activate and displace the striking mechanism. The motor 815 may be coupled with the striking mechanism via one or more linkages, and the motor 815 may displace the striking mechanism towards a gun (e.g., a test unit), or the motor 815 may displace the striking mechanism away from the gun such that the striking mechanism may be released and driven towards the gun (e.g., by gravity). In either case, the striking mechanism may be displaced along a path of travel based on the motor 815, and the striking mechanism may collide with the gun along the path of travel.

The controller 805 may transmit and/or receive data from a sensor 810 (step 825). The data may include a sensor configuration signal from the controller 805, a sensor activation signal from the controller 805, measurements from a sensor 810, an analog signal from a sensor 810, a digital signal from a sensor 810, or a sensor termination signal from the controller 805.

The controller 805 may process the data (step 830), and the data may include, or be based on, the data transmitted and/or received in step 825. For example, the data may include an analog signal produced by a load cell, and the controller 805 may convert the analog signal into a digital signal and store the digital signal, or an indication of the digital signal, in memory. In some cases, the controller 805 may store the data in volatile memory, process the data by performing one or more operations on the data, and store an indication of an output of processing the data in non-volatile memory.

In some cases, the controller 805 may display the data, or analyses of the data, at a display panel (e.g., a control panel). The controller 805 may display a measurement of force based on the data, or the controller 805 may display a data visualization based on the data. For example, the data may include multiple signals, and the controller 805 may process the multiple signals (e.g., convert to digital signals, calculate a peak force, calculate an acceleration, calculate an average measurement, etc.) and display a data visualization based on the processed data. A data visualization may include graphs, histograms, trend lines, indications of standard deviation, etc.

In some cases, the controller 805 may display a warning message. For example, if the controller 805 determines that a measurement satisfies a threshold, the controller 805 may display a warning message at the display panel indicating that the measurement satisfies the threshold. In some examples, the controller 805 may terminate a test cycle based on a measurement satisfying a threshold.

The controller 805 may transmit a termination signal to the motor 815 (step 835), and the motor 815 may power down or otherwise refrain from displacing the striking mechanism based on the termination signal. The controller 805 may transmit the termination signal based on a user input, identifying an error, determining that a measurement satisfies a threshold, or determining that a cycle count has been reached. For example, the controller 805 may use data from a sensor 810 (e.g., a accelerometer, a photo-interrupter, or a microphone) to identify collisions, and the controller may transmit the termination signal based on identifying a threshold number of collisions.

Figure 9:
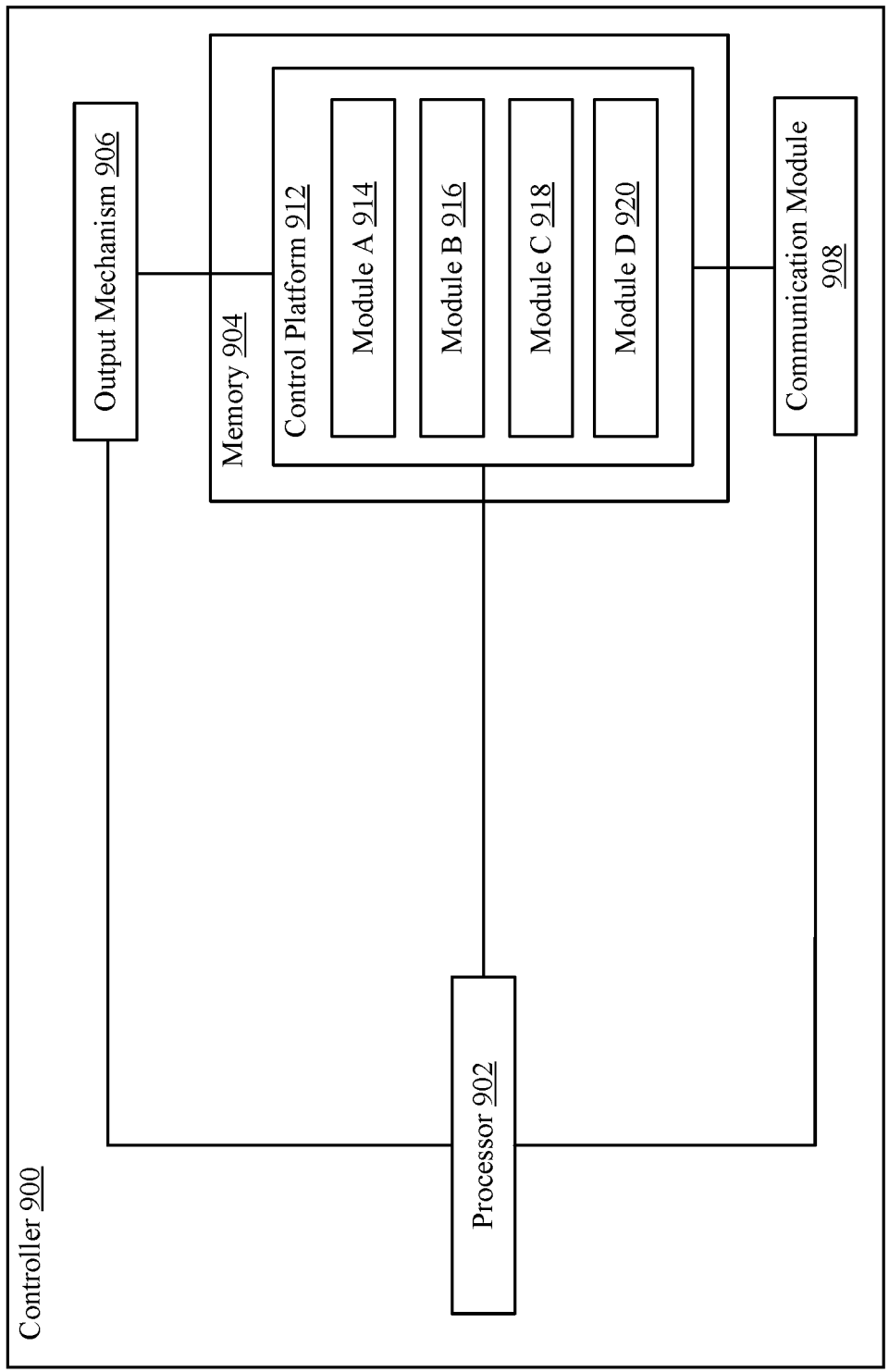
FIG. 9 illustrates an example of a controller that supports testing a gun in accordance with aspects of the present disclosure.

FIG. 9 illustrates an example of a controller 900 able to implement a control platform 912 designed to produce outputs that are helpful in ensuring the controller 900 is used in an appropriate manner. As further discussed below, the control platform 912 (also referred to as a "management platform") may be designed to activate and terminate a motor, transmit signals to one or more sensors, receive signals from one or more sensors, process data, receive user input, or display information at a display panel. For example, an operator may configure a test system by providing user input (e.g., an indication of a cycle count) via a peripheral, and the control platform 912 may manage a motor that automates the displacement of a striking mechanism and monitors one or more sensors of the test system.

In some embodiments, the control platform 912 is embodied as a computer program that is executed by the controller 900. In other embodiments, the control platform 912 is embodied as a computer program that is executed by a computing device to which the controller 900 is communicatively connected. In such embodiments, the controller 900 may transmit relevant information to the computing device for processing as further discussed below. Those skilled in the art will recognize that aspects of the computer program could also be distributed amongst the controller 900 and computing device.

The controller 900 can include a processor 902, memory 904, output mechanism 906, and communication module 908. The processor 902 can have generic characteristics similar to general-purpose processors, or the processor 902 may be an application-specific integrated circuit (ASIC) that provides control functions to the controller 900. As shown in FIG. 9, the processor 902 can be coupled with all components of the controller 900, either directly or indirectly, for communication purposes.

The memory 904 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 902, the memory 904 can also store data generated by the processor 902 (e.g., when executing the modules of the control platform 912). Note that the memory 904 is merely an abstract representation of a storage environment. The memory 904 could be comprised of actual memory chips or modules.

The output mechanism 906 can be any component that is capable of conveying information to an operator of the controller 900. For example, the output mechanism 906 may be a display panel (or simply "display") that includes LEDs, organic LEDs, liquid crystal elements, or electrophoretic elements. Alternatively, the display may simply be a series of illuminants (e.g., LEDs) that are able to indicate the status of the controller 900. Thus, the display may indicate whether the controller 900 is presently in an active state, an inactive state, an error state, etc. As another example, the output mechanism 906 may be a loudspeaker (or simply "speaker") that is able to audibly convey information to the operator.

The communication module 908 may be responsible for managing communications between the components of the controller 900. Additionally or alternatively, the communication module 908 may be responsible for managing communications with sensors, motors, or computing devices that are external to the controller 900. Examples of computing devices include mobile phones, tablet computers, wearable electronic devices (e.g., fitness trackers), and network-accessible server systems comprised of computer servers. Accordingly, the communication module 908 may be wireless communication circuitry that is able to establish communication channels with computing devices. Examples of wireless communication circuitry include integrated circuits (also referred to as "chips") configured for Bluetooth®, Wi-Fi®, Near Field Communication (NFC), and the like.

Outputs produced by sensors, motors, or computing devices may be provided to the control platform 912 for examination or analysis. In some examples, the communication module 908 may be electronically coupled with one or more sensors, and the control platform 912 may perform an operation on data received from the one or more sensors. For example, the control platform 912 may convert an analog signal to a digital signal and store the digital signal in the memory 904. The output mechanism 906 may additionally or alternatively display information based on the digital signal. For example, the output mechanism 906 may display, based a signal received from a sensor of the one or more sensors, a force value. An operator may review the displayed force value to verify that a test system is operating as desired.

For convenience, the control platform 912 may be referred to as a computer program that resides in the memory 904. However, the control platform 912 could be comprised of software, firmware, or hardware components that are implemented in, or accessible to, the controller 900. In accordance with embodiments described herein, the control platform 912 may include Module A 914, Module B 916, Module C 918, and Module D 920. As an illustrative example, Module A 914 may process data generated by, and obtained from, an accelerometer, Module B 916 may process data generated by, and obtained from, a load cell, Module C 918 may process data generated by, and obtained from, a photo-interrupter, and Module D 920 may process data generated by, and obtained from, a camera. Because the data obtained by these modules may have different formats, structures, and content, the instructions executed by these modules can (and often will) be different. For example, the instructions executed by Module A 914 to process data generated by an accelerometer may be different than the instructions generated by Module D 920 to process data generated by a camera. As a specific example, Module D 920 may implement image processing algorithms (e.g., for denoising, despeckling, etc.) that are not necessary for processing data generated by an accelerometer.

Figure 10:
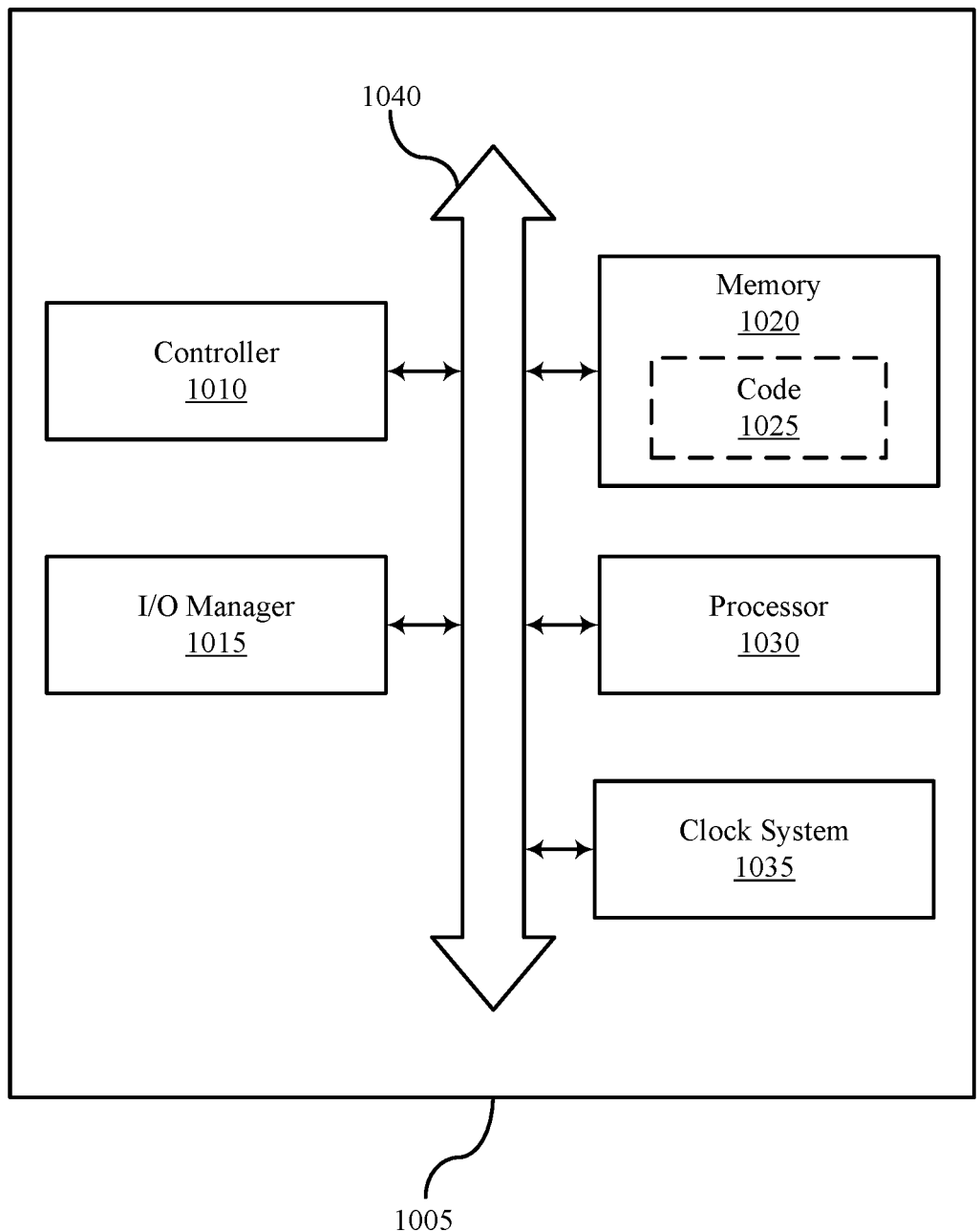
FIG. 10 illustrates an example of a system that supports testing a gun in accordance with aspects of the present disclosure.

FIG. 10 illustrates an example of a system 1000 that supports testing a gun in accordance with aspects of the present disclosure. The device 1005 may be operable to implement the technology, systems, or techniques disclosed herein. The device 1005 may include components such as a controller 1010, an input/output (I/O) manager 1015, memory 1020, code 1025, a processor 1030, a clock system 1035, and a bus 1040. The components of the device 1005 may communicate via one or more buses 1040. The device 1005 may be an example of, or include components of, a controller or a control platform as described herein.

The controller 1010 may determine that a gunshot is to be simulated. The controller 1010 may determine that the gunshot is to be simulated at a gun, and the controller 1010 may determine that the gunshot is to be simulated based on a user input (e.g., an operator input) or a job scheduler (e.g., a cron job).

The controller 1010 may cause, in response to determining that the gunshot is to be simulated, a striking mechanism to be directed towards a component of the gun. The controller may activate a motor, causing the motor to displace the striking mechanism away from the gun such that the striking mechanism is released and driven towards the gun, or the controller may activate the motor, causing the motor to drive the striking mechanism towards the gun. Causing the striking mechanism to be directed towards the component of the gun may result in a collision between the first compressible rod and a second compressible rod coupled with the component of the gun and movement of the component of the gun In some cases, the striking mechanism may include a first compressible rod located proximate to a sensor (e.g., a load cell). The controller 1010 may be coupled with the sensor via a physical communication channel (e.g., a wire, a bus, etc.) or a virtual communication channel (e.g., a radio frequency spectrum, a wireless communication protocol, etc.).

The I/O manager 1015 may manage input and output signals for the device 1005. The I/O manager 1015 may also manage various peripherals such an input device (e.g., a button, a switch, a mouse, a keyboard, a touch screen, a pressure sensor, a heat sensor, a proximity sensor, etc.) and an output device (e.g., a display panel, a monitor, an LED, a speaker, etc.).

The memory 1020 may include or store code (e.g., software) 1025. The memory 1020 may include volatile memory, such as random-access memory (RAM) and/or non-volatile memory, such as read-only memory (ROM). The code 1025 may be computer-readable and computer-executable, and when executed, the code 1025 may cause the processor 1030 to perform various operations or functions described here.

The processor 1030 may be an example or component of a central processing unit (CPU), an ASIC, or a field programmable gate array (FPGA). In some embodiments, the processor 1030 may utilize an operating system or software such as Microsoft Windows®, iOS®, Android®, Linux®, Unix®, or the like. The clock system 1035 control a timer for use by the disclosed embodiments.

The controller 1010, or its sub-components, may be implemented in hardware, software (e.g., software or firmware) executed by a processor, or a combination thereof. The controller 1010, or its sub-components, may be physically located in various positions. For example, in some cases, the controller 1010, or its sub-components may be distributed such that portions of functions are implemented at different physical locations by one or more physical components.

Figure 11:
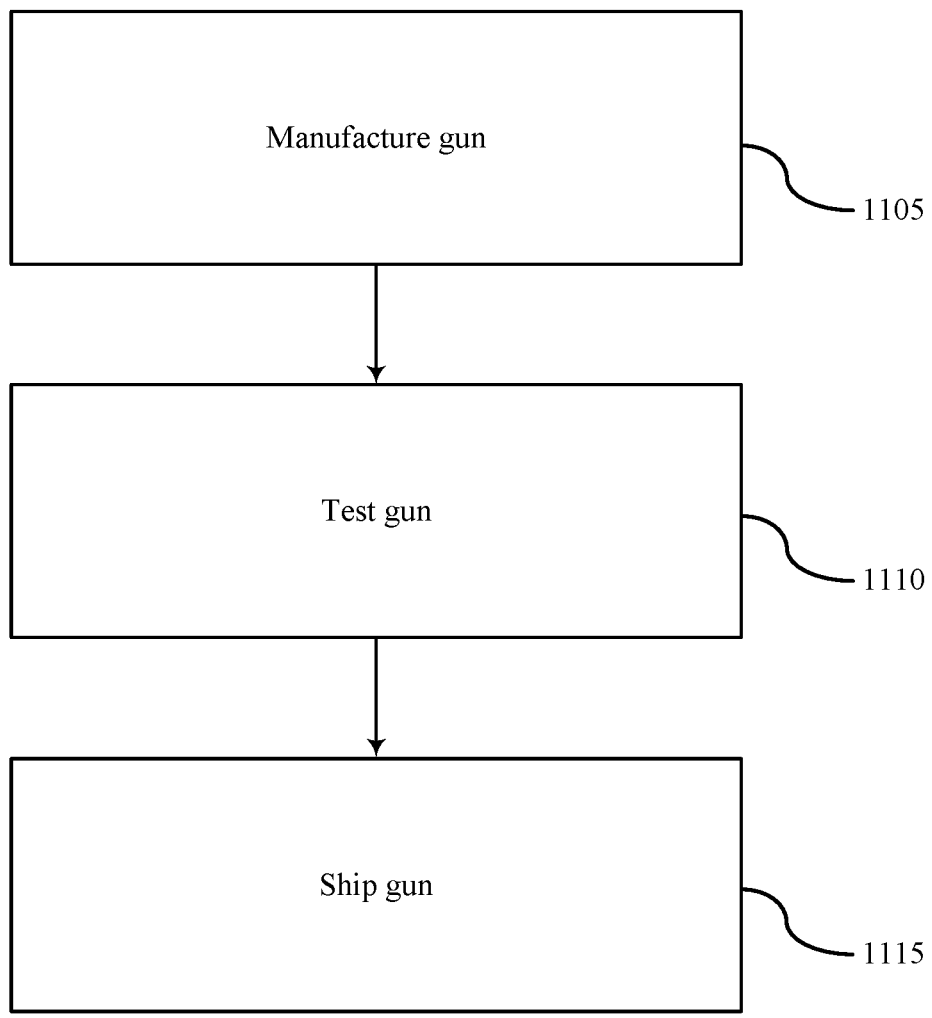
FIG. 11 illustrates an example of a flowchart that supports testing a gun in accordance with aspects of the present disclosure.
Figure 11:

FIG. 11 illustrates an example of a flowchart 1100 that supports testing a gun in accordance with aspects of the present disclosure. Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Initially, a gun manufacturer (or simply "manufacturer") may manufacture a gun that is able to implement aspects of the present disclosure (step 1105). For example, the manufacturer may machine, cut, shape, or otherwise make parts to be included in the gun. Thus, the manufacturer may also design those parts before machining occurs, or the manufacturer may verify designs produced by another entity before machining occurs. Additionally or alternatively, the manufacturer may obtain parts that are manufactured by one or more other entities. Thus, the manufacturer may manufacture the gun from components produced entirely by the manufacturer, components produced by other entities, or a combination thereof. Often, the manufacturer will obtain some parts and make other parts that are assembled together to form the gun (or a component of the gun).

In some embodiments, the manufacturer also generates identifying information related to the gun. For example, the manufacturer may etch (e.g., mechanically or chemically), engrave, or otherwise append identifying information onto the gun itself. As another example, the manufacturer may encode at least some identifying information into a data structure that is associated with the gun. For instance, the manufacturer may etch a serial number onto the gun, and the manufacturer may also populate the serial number (and other identifying information) into a data structure for recording or tracking purposes. Examples of identifying information include the make of the gun, the model of the gun, the serial number, the type of projectiles used by the gun, the caliber of those projectiles, the type of firearm, the barrel length, and the like. In some cases, the manufacturer may record a limited amount of identifying information (e.g., only the make, model, and serial number), while in other cases the manufacturer may record a larger amount of identifying information.

The manufacturer may then test the gun (step 1110). The manufacturer may test the gun according to the systems and techniques described herein to simulate firing live ammunition. The manufacturer may, in some cases, also fire live ammunition from the gun.

In some embodiments, the manufacturer tests all of the guns that are manufactured. In other embodiments, the manufacturer tests a subset of the guns that are manufactured. For example, the manufacturer may randomly or semi-randomly select guns for testing, or the manufacturer may select guns for testing in accordance with a predefined pattern (e.g., one test per 5 guns, 10 guns, or 100 guns). Moreover, the manufacturer may test the gun in its entirety, or the manufacturer may test a subset of its components. For example, the manufacturer may test the component(s) that it manufactures. As another example, the manufacturer may test newly designed components or randomly selected components. Thus, the manufacturer could test select component(s) of the gun, or the manufacturer could test the gun as a whole. For example, the manufacturer may test the barrel to verify that it meets a precision threshold and the cartridge feed system to verify that it meets a reliability threshold. As another example, the manufacturer may test a group of guns (e.g., all guns manufactured during an interval of time, guns selected at random over an interval of time, etc.) to ensure that those guns fire at a sufficiently high pressure (e.g., 70,000 pounds per square inch (PSI)) to verify that a safety threshold is met.

Thereafter, the manufacturer may ship the gun to a dealer (step 1115). In the event that the gun is a firearm, the manufacturer may ship the gun to a Federal Firearms Licensed (FFL) dealer. For example, a purchaser (also referred to as a "customer") may purchase the apparatus through a digital channel or non-digital channel. Examples of digital channels include web browsers, mobile applications, and desktop applications, while examples of non-digital channels include ordering via the telephone and ordering via a physical storefront. In such a scenario, the gun may be shipped to the FFL dealer so that the purchaser can obtain the gun from the FFL dealer. The FFL dealer may be directly or indirectly associated with the manufacturer of the gun. For example, the FFL dealer may be a representative of the manufacturer, or the FFL dealer may sell and distribute guns on behalf of the manufacturer (and possibly other manufacturers).

Note that while the sequences of the steps performed in the processes described herein are exemplary, the steps can be performed in various sequences and combinations. For example, steps could be added to, or removed from, these processes. Similarly, steps could be replaced or reordered. As an example, the manufacturer may iteratively test components while manufacturing the gun, and therefore perform multiple iterations of steps 1105 and 1110 either sequentially or simultaneously (e.g., one component may be tested while another component is added to the gun). Thus, the descriptions of these processes are intended to be open ended.

Figure 12:
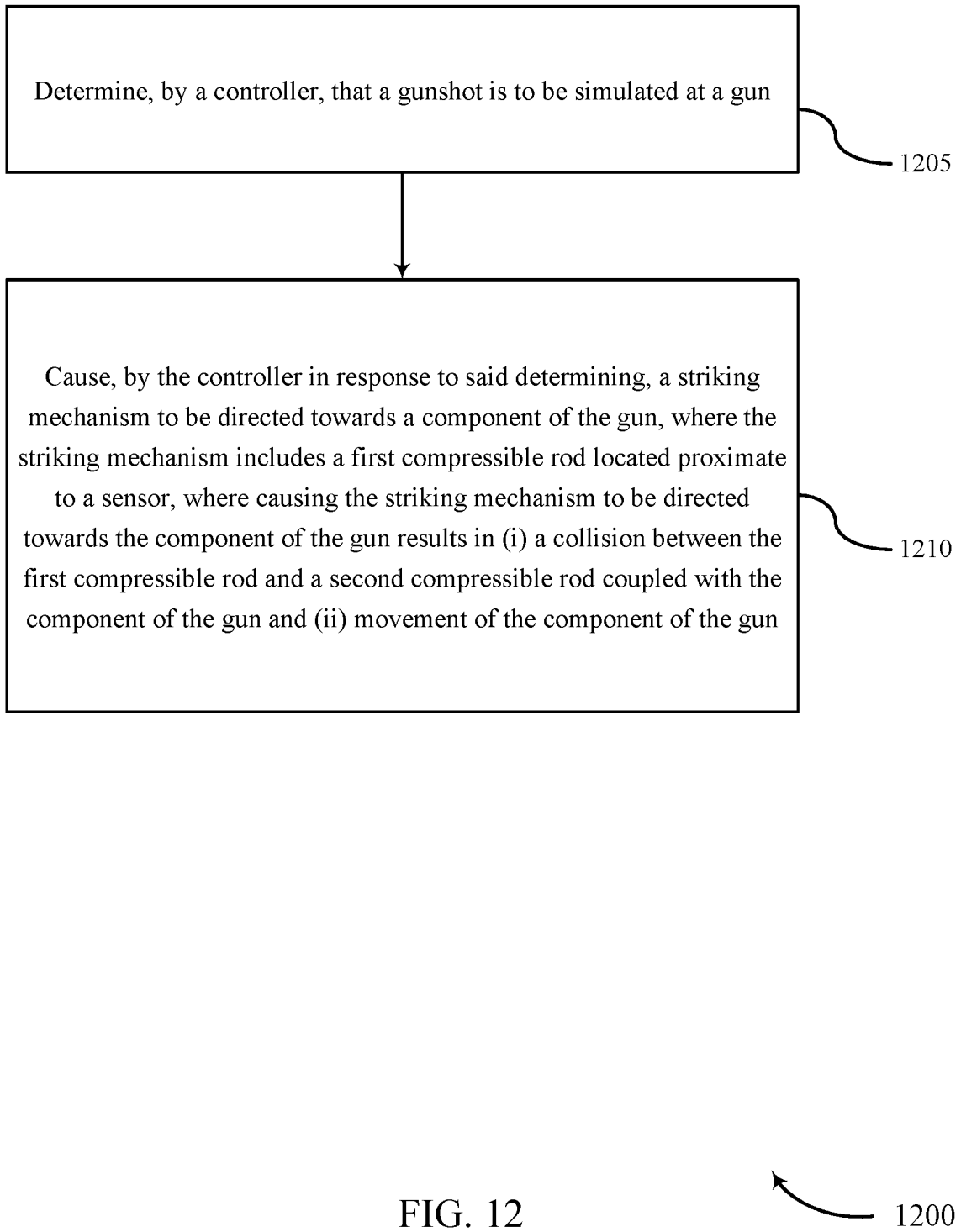
FIG. 12 illustrates an example of a flowchart that supports testing a gun in accordance with aspects of the present disclosure.

FIG. 12 shows a flowchart illustrating a method 1200 that supports testing a gun in accordance with aspects of the present disclosure. The operations of the method 1200 may be implemented by a controller or components thereof, as described herein. For example, the operations of the method 1200 may be performed by a controller 900 as described with reference to FIG. 9, by a controller 1010 as described with reference to FIG. 10, or by a device 1005 as described with reference to FIG. 10. In some examples, a controller may execute a set of instructions to perform the described functions. Additionally or alternatively, the controller may perform aspects of the described functions using special-purpose hardware.

At step 1205, the controller may determine that a gunshot is to be simulated. The controller may determine that a gunshot is to be simulated at a gun. In some cases, the controller may determine that a gunshot is to be simulated based on a user input (e.g., an operator input). The controller may determine a cycle count for simulation. For example, based on a user input or a default configuration, the controller may determine that a single round of ammunition, a hundred rounds of ammunition, ten thousand rounds of ammunition, etc. are to be simulated. The controller may determine a type of ammunition that is to be simulated. For example, an operated may indicate a cartridge load to simulate, and the controller may determine a striker velocity based on the indicated cartridge load. In some cases, the controller may suggest a compressible rod based on the indicated cartridge load.

At step 1210, the controller may cause, in response to determining that the gunshot is to be simulated, a striking mechanism to be directed towards a component of the gun. The striking mechanism may include a first compressible rod located proximate to a sensor (e.g., a load cell). In some cases, the striking mechanism may include a spring located such that the first compressible rod contacts the sensor. Causing the striking mechanism to be directed towards the component of the gun may result in (i) a collision between the first compressible rod and a second compressible rod coupled with the component of the gun and (ii) movement of the component of the gun. In some cases, the gun may include a spring located such that the second compressible rod contacts the breechblock of the gun.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 13:
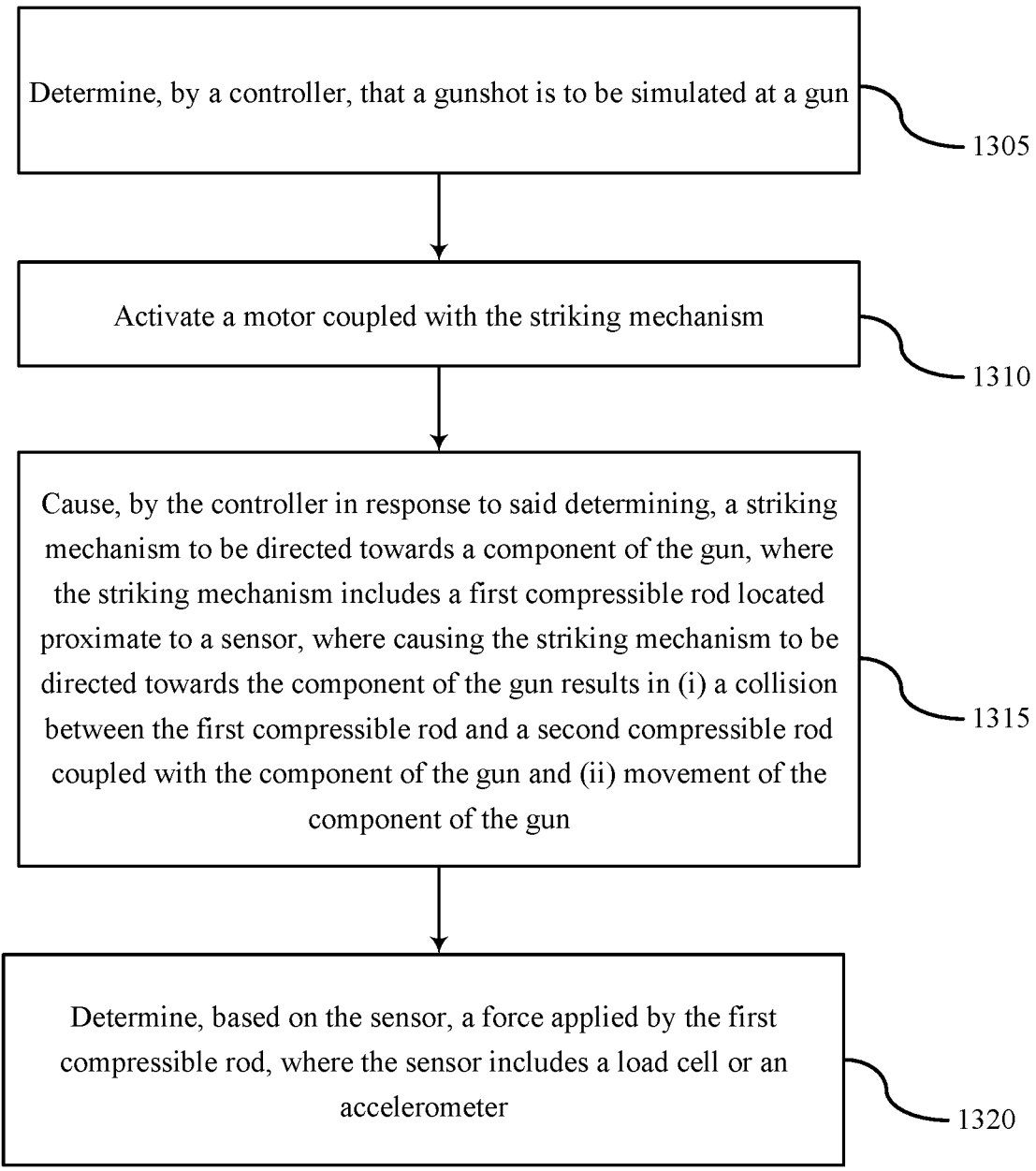
FIG. 13 illustrates an example of a flowchart that supports testing a gun in accordance with aspects of the present disclosure.

FIG. 13 shows a flowchart illustrating a method 1300 that supports testing a gun in accordance with aspects of the present disclosure. The operations of the method 1300 may be implemented by a controller or components thereof, as described herein. For example, the operations of the method 1200 may be performed by a controller 900 as described with reference to FIG. 9, by a controller 1010 as described with reference to FIG. 10, or by a device 1005 as described with reference to FIG. 10. In some examples, a controller may execute a set of instructions to perform the described functions. Additionally or alternatively, the controller may perform aspects of the described functions using special-purpose hardware.

At step 1305, the controller may determine that a gunshot is to be simulated at a gun. At 1310, the controller may activate a motor coupled with a striking mechanism. For example, the controller may be coupled with the motor, the controller may transmit an activation signal to the motor, and the motor may activate based on receiving the activation signal. In some cases, the motor may displace the striking mechanism based on receiving the activation signal.

At step 1315, the controller may cause, in response to determining that a gunshot is to be simulated at the gun, the striking mechanism to be directed towards a component of the gun. The controller may cause the gunshot to be simulated at the gun based on activating the motor. The striking mechanism may include a first compressible rod located proximate to a sensor, where causing the striking mechanism to be directed towards the component of the gun results in (i) a collision between the first compressible rod and a second compressible rod coupled with the component of the gun and (ii) movement of the component of the gun.

At step 1320, the controller may determine, based on the sensor, a force applied by the first compressible rod, where the sensor includes a load cell or an accelerometer. The controller may store an indication of the force applied by the first compressible rod in memory. Additionally or alternatively, the controller may display an indication of the force applied by the first compressible rod at a display panel.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

EXAMPLES

Several aspects of the present disclosure are set forth examples. Note that, unless otherwise specified, all of these examples can be combined with one another. Accordingly, while a feature may be described in the context of a given example, the feature may be similarly applicable to other examples.

In some examples, a system (or apparatus) may support applying force to a component of a gun so as to simulate firing live ammunition. The system may include an attachment mechanism including two or more linkage components that are mechanically coupled, where the attachment mechanism stably holds the gun in a predetermined orientation, a backstop mechanism coupled with the attachment mechanism such that the backstop mechanism is able to accommodate planar movement of the attachment mechanism, a striking mechanism that has (i) a distal end at which both a force sensor and a compressible rod are situated and (ii) a proximal end about which the distal end is able to pivot, a motor configured to actuate the striking mechanism so that, when released, the distal end of the striking mechanism pivots about the proximal end of the striking mechanism so as to initiate a collision with the gun held in the attachment mechanism, and a controller configured to: convert an analog signal that is generated by the force sensor in response to the collision into a digital signal, and store the digital signal in memory.

In some examples, a system (or apparatus) may support simulating a gunshot. The gunshot may be simulated such that a gun is subjected to forces characteristic of the gun firing a round of live ammunition. The system may include a striking mechanism configured for displacement along an arcuate path of travel that includes a first compressible rod, a second compressible rod coupled with a first component of the gun, an attachment mechanism coupled with a second component of the gun such that the second compressible rod is located in the arcuate path of travel, and a backstop mechanism coupled with the attachment mechanism.

In some examples, the system may further include a motor operable to displace the striking mechanism along the arcuate path of travel in a periodic manner, such that the first compressible rod collides with the second compressible rod repeatedly over an interval of time.

In some examples, the system may further include a release mechanism operable to release the striking mechanism based on the motor displacing the striking mechanism along the arcuate path of travel.

In some examples, the striking mechanism includes potential energy that is substantially similar to chemical energy associated with a round of live ammunition. In some examples, the striking mechanism possesses potential energy that is substantially similar to chemical energy associated with a round of live ammunition. In some cases, the potential energy is based on one or more of: a mass of the striking mechanism, a height of the striking mechanism, and the arcuate path of travel.

In some examples, the system may further include a sensor operable to produce, based on displacement of the striking mechanism along the arcuate path, an output signal indicating a force value, where the sensor is coupled with the striking mechanism or the first component.

In some examples, the system may further include a sensor operable to produce, based on displacement of the striking mechanism along the arcuate path, an output signal indicating an acceleration value, where the sensor is coupled with the striking mechanism or the first component of the gun.

In some examples, the system may further include a sensor operable to produce an output signal based on displacement of the striking mechanism along the arcuate path, where the sensor includes a photo-interrupter, an accelerometer, a load cell, a microphone, a linear encoder, or a linear position sensor.

In some examples, the system may further include a controller coupled with a sensor, where the controller is operable to store a digital signal based on an output signal produced by the sensor.

In some examples, the controller further includes an analog-to-digital converter operable to convert the output signal into the digital signal, where the output signal is based on displacement of the striking mechanism. In some examples, the output signal is an analog signal. In some examples, the output signal is produced by a load cell.

In some examples, the controller is further operable to generate, at a display panel, a visual representation of the digital signal, where the digital signal indicates a velocity of movement of the first component, or a force applied by the first compressible rod.

In some examples, the system may further include a motor operable to displace the striking mechanism along the arcuate path of travel in response to an initiation signal generated by the controller.

In some examples, the system may further include a spring coupled with the first compressible rod such that the first compressible rod is in contact with a load cell.

In some examples, the system may further include a spring coupled with the second compressible rod such that the second compressible rod is in contact with a breechblock.

In some examples, a method may support simulating a gunshot. The method may include directing a striking mechanism towards a component of a gun, where the striking mechanism comprises a first compressible rod located proximate to a sensor, contacting, with the first compressible rod and based on directing the striking mechanism towards the component of the gun, a second compressible rod coupled with the component of the gun, and displacing the component of the gun based on contacting the second compressible rod with the first compressible rod.

In some examples, a method may support simulating a gunshot. The method may include determining, by a controller, that the gunshot is to be simulated at a gun, and causing, by the controller in response to said determining, a striking mechanism to be directed towards a component of the gun, where the striking mechanism includes a first compressible rod located proximate to a sensor, where causing the striking mechanism to be directed towards the component of the gun results in (i) a collision between the first compressible rod and a second compressible rod coupled with the component of the gun and (ii) movement of the component of the gun.

In some examples, the method may further include determining, based on a second sensor, a velocity of the movement of a component of the gun, where the second sensor includes a camera oriented at the component of the gun or an accelerometer coupled with the component of the gun.

In some examples, the velocity of the movement of the component of the gun may satisfy a similarity threshold with an expected velocity of movement. In some examples, the second compressible rod may be mechanically coupled with the component of the gun. In some examples, the component of the gun may include a slide, a barrel, or a breechblock. In some examples, the second compressible rod may contact a breechblock and/or a barrel of the gun. In some examples, the breechblock and/or barrel of the gun may be in contact with a slide of the gun. In some examples, one or more intervening may exist between the breechblock and/or barrel and the slide. In some examples, the expected velocity may correspond to a velocity of movement responsive to firing a round of live ammunition. In some examples, the similarity threshold may be a variance of 1%, 20%, or anywhere in between.

In some examples, the method may further include determining, based on the sensor, a force applied by the first compressible rod, where the sensor includes a load cell or an accelerometer.

In some examples, the first compressible rod is configured to apply force to the component of the gun in a manner that is substantially similar to how force would be applied to the component of the gun in response to a ballistic event at the gun. In some examples, the ballistic event is firing a round of live ammunition.

In some examples, the method may further include loading the gun into an attachment mechanism that is coupled with a backstop mechanism, so as to simulate a shooter holding the gun, where the backstop mechanism includes a spring, a damper, or both.

In some examples, the method may further include activating a motor coupled with the striking mechanism, where directing the striking mechanism towards the component of the gun is based on activating the motor.

In some examples, a system (or apparatus) may support simulating a gunshot. The gunshot may be simulated such that a gun is subjected to forces characteristic of the gun firing a round of live ammunition. The system may include means for holding a gun such that the gun is able to move along a displacement path, means for applying force to the gun so as to move the gun along the displacement path in a manner characteristic of gun movement responsive to firing a round of live ammunition while being held by a shooter, and means for measuring the force applied to the gun. In some examples, the means for holding the gun is an attachment mechanism. In some examples, the means for holding the gun is a linkage, a four-bar linkage, a fastener, an adhesive, or a housing. In some examples, the means for applying force to the gun is a striking mechanism. In some examples, the means for applying force to the gun is a compressible rod, a second compressible rod, a hammer, a piston, or an actuator. In some examples, the means for measuring the force applied to the gun is a load cell. In some examples, the means for measuring the force applied to the gun is an accelerometer, an IMU, a camera, a microphone, or a linear position sensor.

In some examples, the system may further include means for converting an analog signal into a digital signal, where the means for measuring the force applied to the gun operates based on the means for converting the analog signal into the digital signal. In some examples, the means for converting the analog signal into the digital signal is a controller. In some examples, the means for converting the analog signal into the digital signal is a processor, an oscilloscope, or an ADC.

In some examples, the system may further include means for generating a visual representation of the force applied to the gun. The visual representation of the force applied to the gun may include a numeric value, a measurement of force, or a graph. In some examples, the means for generating the visual representation of the force is a module. In some examples, the means for generating the visual representation of the force is a display panel, a computer, a monitor, a computer program, software, firmware, or hardware.

In some examples, the system may include means for storing a value indicating the force applied to the gun. The value may correspond to a measurement of force. In some examples, the means for storing the value is a module. In some examples, the means for storing the value is a non-transitory medium, memory, a computer program, software, firmware, or hardware.

In some examples, the system may include means for receiving user input indicating a number of cycles for the system to run, and means for running the number of cycles in an automated fashion, where running each cycle of the number of cycles includes the means for applying force to the gun applying force to the gun so as to move the gun along the displacement path. In some examples, the means for receiving the user input is a module. In some examples, the means for receiving the user input is a keyboard, a mouse, a peripheral device, a touch screen, non-transitory medium, memory, a computer program, software, firmware, or hardware. In some examples, the means for running the number of cycles is a controller. In some examples, the means for running the number of cycles is a motor, a power source, an electrical circuit, a processing system, or a module.

In some examples, the means for holding the gun may further include means for controlling movement of the gun so as to simulate the shooter holding the gun while firing the round of live ammunition. In some examples, the means for controlling movement of the gun may include a backstop mechanism. In some examples, the means for controlling movement of the gun may include a spring, a damper, a dashpot, a shock, hydraulic fluid, or compressed gas.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The Detailed Description provided herein, in connection with the appended figures (or drawings), describes example configurations and does not represent all the examples that may be implemented or that are within the scope of the claims. In the figures, similar components or features may have the same reference label, and components of the same or similar type may be distinguished by appending a dash and a second label to the reference label (e.g., 105-*a* and 105-*b*). If just the first reference label is used in the specification, the description is applicable to any one of the similar components having the same first reference label regardless of the second label. The term "example" used herein means "serving as an illustration or instance," and not "a preferred example."

The functions described herein may be implemented or performed with a controller. A controller may include a module, a general-purpose processor, a specific-purpose processor, a digital signal processor (DSP), a CPU, a graphics processing unit (GPU), a microprocessor, a tensor processing unit (TPU), a neural processing unit (NPU), an image signal processor (ISP), a hardware security module (HSM), an ASIC, a programmable logic device (such as an FPGA), a state machine, a circuit (such as a circuit including discrete hardware components, analog components, or digital components), or any combination thereof. Some aspects of a controller may be programmable, while other aspects of a control may not be programmable. In some examples, a digital component of a controller may be programmable (such as a CPU), and in some other examples, an analog component of a controller may not be programmable (such as a differential amplifier).

In some cases, the functions described herein may be implemented in hardware and/or software (e.g., firmware) executed by a processor. If implemented in software executed by a processor, the functions may be stored on or transmitted over as instructions or code on a computer-readable medium. Features or components implementing functions may also be physically located at various locations, and different functions or portions of functions may be implemented at different physical locations.

Computer-readable media includes both non-transitory computer storage media and communication media. A non-transitory storage medium may be any available medium that may be accessed by a computer or component. For example, non-transitory computer-readable media may include RAM, SRAM, DRAM, ROM, EEPROM, flash memory, magnetic storage devices, or any other non-transitory medium that may be used to carry and/or store program code means in the form of instructions and/or data structures. The instructions and/or data structures may be accessed by a general-purpose computer, a special-purpose computer, a general-purpose processor, a special-purpose processor, or a controller. A computer-readable media may include any combination of the above, and a compute component may include computer-readable media.

A claim is not intended to invoke means-plus-function interpretation (or step-plus-function interpretation) unless the claim uses the phrase "means for" together with an associated function. When a means-plus-function interpretation does apply to a clause in a claim, the given clause is intended to cover the structures describe herein as performing the associated function, including both structural equivalents that operate in the same manner, and equivalent structures that provide the same function.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A system for applying force to a component of a gun so as to simulate firing live ammunition, the system comprising:
   an attachment mechanism including two or more linkage components that are mechanically coupled, wherein the attachment mechanism stably holds the gun in a predetermined orientation;
   a backstop mechanism coupled with the attachment mechanism such that the backstop mechanism is able to accommodate planar movement of the attachment mechanism, wherein the backstop mechanism permits movement of the attachment mechanism based on (i) a dynamic spring rate and (ii) a stroke length that together simulate movement of the gun while a user is gripping the gun, and wherein the dynamic spring rate and/or the stroke length are configurable to allow for simulation of different types of grips that the user could employ;
   a striking mechanism that has (i) a distal end at which both a force sensor and a first compressible rod are situated and (ii) a proximal end about which the distal end is able to pivot, wherein the distal end of the striking mechanism is configured for displacement along an arcuate path of travel between a first position and a second position;
   a second compressible rod located within a barrel of the gun and against a breechface of the gun;
   a motor configured to actuate the striking mechanism from the first position to the second position to increase gravitational potential energy of the striking mechanism so that, when released, gravity causes the distal end of the striking mechanism to pivot about the proximal end of the striking mechanism so as to initiate a collision with the first compressible rod of the striking mechanism and the second compressible rod located within the barrel of the gun held in the attachment mechanism, wherein a distance between the second location and the gun is greater than a distance between the first location and the gun; and
   a controller configured to:
      convert an analog signal that is generated by the force sensor in response to the collision into a digital signal, and
      store the digital signal in memory.

2. A system for simulating a gunshot, comprising:
   a striking mechanism comprising a first compressible rod, wherein the striking mechanism is configured for displacement along an arcuate path of travel between a first position and a second position;
   a second compressible rod located within a barrel of a gun;
   an attachment mechanism coupled with the gun such that the second compressible rod is located in the arcuate path of travel;
   a backstop mechanism coupled with the attachment mechanism, wherein the backstop mechanism permits movement of the attachment mechanism based on (i) a dynamic spring rate and (ii) a stroke length that together simulate movement of the gun while a user is gripping the gun, and wherein the dynamic spring rate and/or the stroke length are configurable to allow for simulation of different types of grips that the user could employ; and
   a motor configured to actuate the striking mechanism along the arcuate path of travel from the first position to the second position, wherein a distance between the second location and the gun is greater than a distance between the first location and the gun, and wherein the striking mechanism is configured to be released from the second location such that gravity causes the first compressible rod of the striking mechanism to collide with the second compressible rod located within the barrel of the gun.

3. The system of claim 2, further comprising:
   a release mechanism operable to release the striking mechanism based on the motor displacing the striking mechanism along the arcuate path of travel.

4. The system of claim 2, wherein a gravitational potential energy of the striking mechanism is substantially similar to chemical energy associated with a round of live ammunition.

5. The system of claim 2, further comprising:
   a sensor operable to produce, based on displacement of the striking mechanism along the arcuate path, an output signal indicating a force value, wherein the sensor is coupled with the striking mechanism or the gun.

6. The system of claim 2, further comprising:
a sensor operable to produce, based on displacement of the striking mechanism along the arcuate path, an output signal indicating an acceleration value, wherein the sensor is coupled with the striking mechanism or the gun.

7. The system of claim 2, further comprising:
a sensor operable to produce an output signal based on displacement of the striking mechanism along the arcuate path, wherein the sensor comprises a photo-interrupter, an accelerometer, a load cell, a microphone, a linear encoder, or a linear position sensor.

8. The system of claim 2, further comprising:
a controller coupled with a sensor, wherein the controller is operable to store a digital signal based on an output signal produced by the sensor.

9. The system of claim 8, wherein the controller further comprises:
an analog-to-digital converter operable to convert the output signal into the digital signal, wherein the output signal is based on displacement of the striking mechanism.

10. The system of claim 8, wherein the controller is further operable to:
generate, at a display panel, a visual representation of the digital signal, wherein the digital signal indicates a velocity of movement of the gun, or a force applied by the first compressible rod.

11. The system of claim 8, wherein the motor is operable to displace the striking mechanism along the arcuate path of travel in response to an initiation signal generated by the controller.

12. The system of claim 2, further comprising:
a spring coupled with the first compressible rod such that the first compressible rod is in contact with a load cell.

13. The system of claim 2, further comprising:
a spring that is coupled with the second compressible rod so as to bias the second compressible rod towards breechface of the gun, wherein the gun is positioned such that the striking mechanism moving along the arcuate path of travel causes a collision between the first compressible rod and the second compressible rod, and wherein the collision results in force being transferred through the second compressible rod and onto the breechface.

14. A method for simulating a gunshot, comprising:
determining, by a controller, that the gunshot is to be simulated at a gun; and
causing, by the controller in response to said determining, a striking mechanism to be directed along an arcuate path of travel towards a component of the gun, wherein the striking mechanism comprises a first compressible rod located proximate to a sensor, and wherein the gun is coupled with a backstop mechanism, and wherein the causing the striking mechanism to be directed towards the component of the gun includes releasing the striking mechanism from a location that is above the component of the gun;
wherein causing the striking mechanism to be directed towards the component of the gun results in (i) a collision between the first compressible rod and a second compressible rod located within a barrel of the gun and against a breechface of the gun and (ii) movement of the gun, wherein the backstop mechanism permits movement of the gun based on (i) a dynamic spring rate and (ii) a stroke length that together simulate movement of the gun while a user is gripping the gun, and wherein the dynamic spring rate and/or the stroke length are configurable to allow for simulation of different types of grips that the user could employ.

15. The method of claim 14, further comprising:
determining, based on a second sensor, a velocity of the movement of the component of the gun, wherein the second sensor comprises a camera oriented at the component of the gun or an accelerometer coupled with the component of the gun.

16. The method of claim 14, further comprising:
determining, based on the sensor, a force applied by the first compressible rod, wherein the sensor comprises a load cell or an accelerometer.

17. The method of claim 14, wherein the first compressible rod is configured to apply force to the component of the gun in a manner that is substantially similar to how force would be applied to the component of the gun in response to a ballistic event at the gun.

18. The method of claim 14, further comprising:
loading the gun into an attachment mechanism that is coupled with the backstop mechanism, so as to simulate a shooter holding the gun, wherein the backstop mechanism comprises a spring, a damper, or both.

19. The method of claim 14, further comprising:
activating a motor coupled with the striking mechanism, wherein directing the striking mechanism towards the component of the gun is based on activating the motor.

20. A system for simulating a gunshot, comprising:
means for holding a gun such that the gun is able to move along a displacement path, wherein the means for holding the gun permits movement of the gun based on (i) a dynamic spring rate and (ii) a stroke length that together simulate movement of the gun while a user is gripping the gun, and wherein the dynamic spring rate and/or the stroke length are configurable to allow for simulation of different types of grips that the user could employ;
means for applying force to the gun so as to move the gun along the displacement path in a manner characteristic of gun movement responsive to firing a round of live ammunition while being held by a shooter, wherein the means for applying force to the gun is configured to move along an arcuate path of travel and convert gravitational potential energy into force and apply the force to a compressible rod located in a barrel of the gun and against a breechface of the gun; and
means for measuring the force applied to the gun.

21. The system of claim 20, further comprising:
means for converting an analog signal into a digital signal, wherein the means for measuring the force applied to the gun operates based on the means for converting the analog signal into the digital signal.

22. The system of claim 20, further comprising:
means for generating a visual representation of the force applied to the gun.

23. The system of claim 20, further comprising:
means for storing a value indicating the force applied to the gun.

24. The system of claim 20, further comprising:
means for receiving user input indicating a number of cycles for the system to run; and
means for running the number of cycles in an automated fashion, wherein running each cycle of the number of cycles comprises the means for applying force to the gun applying force to the gun so as to move the gun along the displacement path.

25. The system of claim 20, wherein the means for holding the gun further comprises:
  means for controlling movement of the gun so as to simulate the shooter holding the gun while firing the round of live ammunition.

* * * * *